US010095022B2

(12) United States Patent
Jhang et al.

(10) Patent No.: US 10,095,022 B2
(45) Date of Patent: Oct. 9, 2018

(54) OCULAR OPTICAL SYSTEM

(71) Applicant: Genius Electronic Optical Co., Ltd., Taichung (TW)

(72) Inventors: Jia-Sin Jhang, Taichung (TW); Mao Zong Lin, Fujian (CN); Yan Xuan Yin, Fujian (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 99 days.

(21) Appl. No.: 15/348,933

(22) Filed: Nov. 10, 2016

(65) Prior Publication Data

US 2018/0088314 A1 Mar. 29, 2018

(30) Foreign Application Priority Data

Sep. 29, 2016 (CN) .......................... 2016 1 0862324

(51) Int. Cl.
*G02B 3/08* (2006.01)
*G02B 25/00* (2006.01)
*G02B 9/10* (2006.01)
*G02B 25/04* (2006.01)

(52) U.S. Cl.
CPC ............ *G02B 25/001* (2013.01); *G02B 3/08* (2013.01); *G02B 9/10* (2013.01); *G02B 25/04* (2013.01)

(58) Field of Classification Search
CPC .......... G02B 25/001; G02B 3/08; G02B 9/10; G02B 25/04
USPC .......................................................... 359/646
See application file for complete search history.

(56) References Cited

U.S. PATENT DOCUMENTS 5,835,279 A * 11/1998 Marshall ................ G02B 13/18 359/645

* cited by examiner

*Primary Examiner* — James Greece
(74) *Attorney, Agent, or Firm* — JCIPRNET

(57) ABSTRACT

An ocular optical system adapted for an imaging ray of a display image being entered an observer's eye through the ocular optical system to form an image is provided. The ocular optical system includes a first lens and a second lens arranged in order from an eye-side to a display-side along an optical axis. Each of the first lens and the second lens has an eye-side surface and a display-side surface. A maximum distance between the display-side surface of the first lens and the eye-side surface of the second lens parallel to a direction of the optical axis is less than 5 millimeters, and the ocular optical system satisfies: 6≤DLD/EPD≤20. DLD is a diagonal length of the displayed image corresponding to a single pupil of the observer, and EPD represents an exit pupil diameter of the ocular optical system.

15 Claims, 27 Drawing Sheets

| First embodiment | | | | | | | |
|---|---|---|---|---|---|---|---|
| Effective focal length (EFL)=33.485 mm, Half apparent field of view (ω)=45.000°, Fno=8.371, TTL=38.672 mm, System length(SL)=47.463 mm, Exit pupil diameter(EPD)=4 mm | | | | | | | |
| Lens element | Surface | Radius of curvature (mm) | Thickness (mm) | Effective radius (mm) | Refractive index | Abbe number | Focal length (mm) |
| Observer's Pupil 2 | | Infinity | 8.791 | 2.000 | | | |
| First lens element 3 | Eye-side surface 31 | 31.569 | 6.973 | 13.871 | 1.492 | 57.441 | 23.467 |
| | Display-side surface 32 | -16.946 | 0.338 | 14.886 | | | |
| Second lens element 4 | Eye-side surface 41 | -47.444 | 1.999 | 14.990 | 1.661 | 20.401 | -71.604 |
| | Display-side surface 42 | -8548.757 | 29.362 | 14.661 | | | |
| | Display screen 100 | Infinity | | 30.004 | | | |

FIG. 9

| Surface | K | $A_2$ | $A_4$ | $A_6$ | $A_8$ |
|---|---|---|---|---|---|
| 31 | 0.000000E+00 | 0.000000E+00 | -3.523000E-06 | 0.000000E+00 | 0.000000E+00 |
| 32 | -1.000818E+00 | 0.000000E+00 | 1.588500E-05 | 0.000000E+00 | 0.000000E+00 |
| 41 | 0.000000E+00 | 0.000000E+00 | 1.237390E-04 | -3.110000E-07 | 0.000000E+00 |
| 42 | 0.000000E+00 | 0.000000E+00 | 1.226360E-04 | -2.210000E-07 | 0.000000E+00 |
| Surface | $A_{10}$ | $A_{12}$ | $A_{14}$ | $A_{16}$ | $A_{18}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 10

Longitudinal spherical aberration
Field of view
1.00

-0.25  0.0 0.1
Focus (mm)

Field curvature (sagittal direction)
Half apparent field of view (°)
45.000

-0.4  0.0  0.8
Focus (mm)

Field curvature (tangential direction)
Half apparent field of view (°)
45.000

-0.4  0.0  0.8
Focus (mm)

Distortion
Half apparent field of view (°)
45.000

-12  0  12
Distortion rate (%)

| Second embodiment | | | | | | | |
|---|---|---|---|---|---|---|---|
| Effective focal length (EFL)=33.346 mm, Half apparent field of view (ω)=45.000°, Fno=8.336, TTL=38.786 mm, System length(SL)=47.492 mm, Exit pupil diameter(EPD)=4 mm | | | | | | | |
| Lens element | Surface | Radius of curvature (mm) | Thickness (mm) | Effective radius (mm) | Refractive index | Abbe number | Focal length (mm) |
| Observer's Pupil 2 | | Infinity | 8.706 | 2.000 | | | |
| First lens element 3 | Eye-side surface 31 | 31.238 | 7.376 | 13.760 | 1.492 | 57.441 | 23.429 |
| | Display-side surface 32 | -16.915 | 0.356 | 14.890 | | | |
| Second lens element 4 | Eye-side surface 41 | -45.989 | 1.998 | 14.990 | 1.661 | 20.401 | -71.585 |
| | Display-side surface 42 | -1303.964 | 29.056 | 14.669 | | | |
| | Display screen 100 | Infinity | | 30.004 | | | |

FIG. 13

| Surface | K | $A_2$ | $A_4$ | $A_6$ | $A_8$ |
|---|---|---|---|---|---|
| 31 | 0.000000E+00 | 0.000000E+00 | -3.893000E-06 | 0.000000E+00 | 0.000000E+00 |
| 32 | -1.005050E+00 | 0.000000E+00 | 1.545500E-05 | 0.000000E+00 | 0.000000E+00 |
| 41 | 0.000000E+00 | 0.000000E+00 | 1.237100E-04 | -3.090000E-07 | 0.000000E+00 |
| 42 | 0.000000E+00 | 0.000000E+00 | 1.225330E-04 | -2.180000E-07 | 0.000000E+00 |
| Surface | $A_{10}$ | $A_{12}$ | $A_{14}$ | $A_{16}$ | $A_{18}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 14

| Third embodiment | | | | | | | |
|---|---|---|---|---|---|---|---|
| Effective focal length (EFL)=33.559 mm, Half apparent field of view (ω)=45.000°, Fno=8.390, TTL=38.570 mm, System length(SL)=47.423 mm, Exit pupil diameter(EPD)=4 mm | | | | | | | |
| Lens element | Surface | Radius of curvature (mm) | Thickness (mm) | Effective radius (mm) | Refractive index | Abbe number | Focal length (mm) |
| Observer's Pupil 2 | | Infinity | 8.853 | 2.000 | | | |
| First lens element 3 | Eye-side surface 31 | 31.774 | 6.710 | 13.967 | 1.492 | 57.441 | 23.486 |
| | Display-side surface 32 | -16.963 | 0.315 | 14.897 | | | |
| Second lens element 4 | Eye-side surface 41 | -49.913 | 1.999 | 15.004 | 1.661 | 20.401 | -71.555 |
| | Display-side surface 42 | 1083.034 | 29.545 | 14.661 | | | |
| | Display screen 100 | Infinity | | 30.002 | | | |

FIG. 17

| Surface | K | $A_2$ | $A_4$ | $A_6$ | $A_8$ |
|---|---|---|---|---|---|
| 31 | 0.000000E+00 | 0.000000E+00 | -3.153000E-06 | 0.000000E+00 | 0.000000E+00 |
| 32 | -9.951714E-01 | 0.000000E+00 | 1.639400E-05 | 0.000000E+00 | 0.000000E+00 |
| 41 | 0.000000E+00 | 0.000000E+00 | 1.218000E-04 | -3.070000E-07 | 0.000000E+00 |
| 42 | 0.000000E+00 | 0.000000E+00 | 1.210630E-04 | -2.190000E-07 | 0.000000E+00 |
| Surface | $A_{10}$ | $A_{12}$ | $A_{14}$ | $A_{16}$ | $A_{18}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 18

Longitudinal
spherical aberration
Field of view

Field curvature
(sagittal direction)
Half apparent
field of view (°)

Field curvature
(tangential direction)
Half apparent
field of view (°)

Distortion
Half apparent
field of view (°)

| Fourth embodiment | | | | | | | |
|---|---|---|---|---|---|---|---|
| Effective focal length (EFL)=32.777 mm, Half apparent field of view ($\omega$)=45.000°, Fno=8.194, TTL=39.059 mm, System length(SL)=49.938 mm, Exit pupil diameter(EPD)=4 mm | | | | | | | |
| Lens element | Surface | Radius of curvature (mm) | Thickness (mm) | Effective radius (mm) | Refractive index | Abbe number | Focal length (mm) |
| Observer's Pupil 2 | | Infinity | 10.879 | 2.000 | | | |
| First lens element 3 | Eye-side surface 31 | 29.040 | 10.404 | 20.797 | 1.492 | 57.441 | 24.799 |
| | Display-side surface 32 | -18.638 | 2.001 | 20.852 | | | |
| Second lens element 4 | Eye-side surface 41 | 1684.635 | 1.999 | 19.634 | 1.661 | 20.401 | -76.530 |
| | Display-side surface 42 | 49.473 | 24.654 | 18.290 | | | |
| | Display screen 100 | Infinity | | 34.852 | | | |

FIG. 21

| Surface | K | $A_2$ | $A_4$ | $A_6$ | $A_8$ |
|---|---|---|---|---|---|
| 31 | 0.000000E+00 | 0.000000E+00 | -4.562000E-06 | 0.000000E+00 | 0.000000E+00 |
| 32 | -1.001689E+00 | 0.000000E+00 | 1.185800E-05 | 0.000000E+00 | 0.000000E+00 |
| 41 | 0.000000E+00 | 0.000000E+00 | 3.245700E-05 | -6.100000E-08 | 0.000000E+00 |
| 42 | 0.000000E+00 | 0.000000E+00 | 3.965000E-05 | -1.800000E-08 | 0.000000E+00 |
| Surface | $A_{10}$ | $A_{12}$ | $A_{14}$ | $A_{16}$ | $A_{18}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 22

| Fifth embodiment | | | | | | | |
|---|---|---|---|---|---|---|---|
| Effective focal length (EFL)=30.681 mm, Half apparent field of view (ω)=45.000°, Fno=7.670, TTL=36.830 mm, System length(SL)=46.908 mm, Exit pupil diameter(EPD)=4 mm | | | | | | | |
| Lens element | Surface | Radius of curvature (mm) | Thickness (mm) | Effective radius (mm) | Refractive index | Abbe number | Focal length (mm) |
| Observer's Pupil 2 | | Infinity | 10.078 | 2.000 | | | |
| First lens element 3 | Eye-side surface 31 | 27.481 | 9.642 | 19.235 | 1.492 | 57.441 | 23.069 |
| | Display-side surface 32 | -17.172 | 2.028 | 19.326 | | | |
| Second lens element 4 | Eye-side surface 41 | -100.399 | 2.448 | 18.373 | 1.661 | 20.401 | -70.923 |
| | Display-side surface 42 | 90.159 | 22.711 | 16.938 | | | |
| | Display screen 100 | Infinity | | 32.035 | | | |

FIG. 25

| Surface | K | $A_2$ | $A_4$ | $A_6$ | $A_8$ |
|---|---|---|---|---|---|
| 31 | 0.000000E+00 | 0.000000E+00 | -5.088000E-06 | 0.000000E+00 | 0.000000E+00 |
| 32 | -9.910258E-01 | 0.000000E+00 | 1.487900E-05 | 0.000000E+00 | 0.000000E+00 |
| 41 | 0.000000E+00 | 0.000000E+00 | 6.400400E-05 | -1.440000E-07 | 0.000000E+00 |
| 42 | 0.000000E+00 | 0.000000E+00 | 7.208100E-05 | -6.200000E-08 | 0.000000E+00 |
| Surface | $A_{10}$ | $A_{12}$ | $A_{14}$ | $A_{16}$ | $A_{18}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 26

Longitudinal
spherical aberration
Field of view 1.00

-0.3   0.0  0.15
Focus (mm)

Field curvature
(sagittal direction)
Half apparent
field of view (°)

45.000

-2 0.0   12
Focus (mm)

Field curvature
(tangential direction)
Half apparent
field of view (°)

45.000

-2 0.0   12
Focus (mm)

Distortion
Half apparent
field of view (°)

45.000

-6    0    6
Distortion rate (%)

| Sixth embodiment | | | | | | | |
|---|---|---|---|---|---|---|---|
| Effective focal length (EFL)=30.186 mm, Half apparent field of view (ω)=45.000°, Fno=7.546, TTL=36.407 mm, System length(SL)=47.145 mm, Exit pupil diameter(EPD)=4 mm | | | | | | | |
| Lens element | Surface | Radius of curvature (mm) | Thickness (mm) | Effective radius (mm) | Refractive index | Abbe number | Focal length (mm) |
| Observer's Pupil 2 | | Infinity | 10.738 | 2.000 | | | |
| First lens element 3 | Eye-side surface 31 | 28.667 | 9.557 | 19.829 | 1.492 | 57.441 | 22.627 |
| | Display-side surface 32 | -16.267 | 1.865 | 19.992 | | | |
| Second lens element 4 | Eye-side surface 41 | -243.628 | 2.554 | 19.164 | 1.661 | 20.401 | -68.001 |
| | Display-side surface 42 | 55.898 | 22.431 | 18.014 | | | |
| | Display screen 100 | Infinity | | 30.361 | | | |

FIG. 29

| Surface | K | $A_2$ | $A_4$ | $A_6$ | $A_8$ |
|---|---|---|---|---|---|
| 31 | 0.000000E+00 | 0.000000E+00 | -5.647000E-06 | 0.000000E+00 | 0.000000E+00 |
| 32 | -1.040117E+00 | 0.000000E+00 | 1.820200E-05 | 0.000000E+00 | 0.000000E+00 |
| 41 | 0.000000E+00 | 0.000000E+00 | 6.262500E-05 | -1.460000E-07 | 0.000000E+00 |
| 42 | 0.000000E+00 | 0.000000E+00 | 6.641400E-05 | -6.400000E-08 | 0.000000E+00 |
| Surface | $A_{10}$ | $A_{12}$ | $A_{14}$ | $A_{16}$ | $A_{18}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 30

| Seventh embodiment | | | | | | | |
|---|---|---|---|---|---|---|---|
| Effective focal length (EFL)=36.213 mm, Half apparent field of view (ω)=45.000°, Fno=9.053, TTL=40.768 mm, System length(SL)=49.321 mm, Exit pupil diameter(EPD)=4 mm | | | | | | | |
| Lens element | Surface | Radius of curvature (mm) | Thickness (mm) | Effective radius (mm) | Refractive index | Abbe number | Focal length (mm) |
| Observer's Pupil 2 | | Infinity | 8.553 | 2.000 | | | |
| First lens element 3 | Eye-side surface 31 | 35.086 | 7.201 | 12.968 | 1.492 | 57.441 | 24.897 |
| | Display-side surface 32 | -17.616 | 1.805 | 14.439 | | | |
| Second lens element 4 | Eye-side surface 41 | -67.526 | 2.018 | 15.148 | 1.661 | 20.401 | -67.206 |
| | Display-side surface 42 | 134.545 | 29.743 | 14.862 | | | |
| | Display screen 100 | Infinity | | 38.848 | | | |

FIG. 33

| Sur-face | K | $A_2$ | $A_4$ | $A_6$ | $A_8$ |
|---|---|---|---|---|---|
| 31 | 0.000000E+00 | 0.000000E+00 | -2.462000E-06 | 0.000000E+00 | 0.000000E+00 |
| 32 | -1.111473E+00 | 0.000000E+00 | 1.898900E-05 | 0.000000E+00 | 0.000000E+00 |
| 41 | 0.000000E+00 | 0.000000E+00 | 1.241830E-04 | -3.070000E-07 | 0.000000E+00 |
| 42 | 0.000000E+00 | 0.000000E+00 | 1.218940E-04 | -2.230000E-07 | 0.000000E+00 |
| Sur-face | $A_{10}$ | $A_{12}$ | $A_{14}$ | $A_{16}$ | $A_{18}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 34

| Eighth embodiment | | | | | | | |
|---|---|---|---|---|---|---|---|
| Effective focal length (EFL)=14.902 mm, Half apparent field of view (ω)=45.000°, Fno=3.725, TTL=18.620 mm, System length(SL)=23.272 mm, Exit pupil diameter(EPD)=4 mm | | | | | | | |
| Lens element | Surface | Radius of curvature (mm) | Thickness (mm) | Effective radius (mm) | Refractive index | Abbe number | Focal length (mm) |
| Observer's Pupil 2 | | Infinity | 4.652 | 2.000 | | | |
| First lens element 3 | Eye-side surface 31 | 15.606 | 4.898 | 9.429 | 1.492 | 57.441 | 11.998 |
| | Display-side surface 32 | -8.547 | 0.489 | 9.802 | | | |
| Second lens element 4 | Eye-side surface 41 | -43.699 | 1.303 | 9.782 | 1.661 | 20.401 | -51.859 |
| | Display-side surface 42 | 167.121 | 11.930 | 9.218 | | | |
| | Display screen 100 | Infinity | | 12.211 | | | |

FIG. 37

| Surface | K | $A_2$ | $A_4$ | $A_6$ | $A_8$ |
|---|---|---|---|---|---|
| 31 | 0.000000E+00 | 0.000000E+00 | -4.975800E-05 | 0.000000E+00 | 0.000000E+00 |
| 32 | -8.489553E-01 | 0.000000E+00 | 3.703300E-05 | 0.000000E+00 | 0.000000E+00 |
| 41 | 0.000000E+00 | 0.000000E+00 | 1.181800E-04 | 4.600000E-08 | -5.000000E-09 |
| 42 | 0.000000E+00 | 0.000000E+00 | 2.010590E-04 | 3.480000E-07 | -1.000000E-09 |
| Surface | $A_{10}$ | $A_{12}$ | $A_{14}$ | $A_{16}$ | $A_{18}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 38

| Ninth embodiment | | | | | | | |
|---|---|---|---|---|---|---|---|
| Effective focal length (EFL)=30.417 mm, Half apparent field of view ($\omega$)=45.000°, Fno=7.604, TTL=37.323 mm, System length(SL)=47.675 mm, Exit pupil diameter(EPD)=4 mm | | | | | | | |
| Lens element | Surface | Radius of curvature (mm) | Thickness (mm) | Effective radius (mm) | Refractive index | Abbe number | Focal length (mm) |
| Observer's Pupil 2 | | Infinity | 10.353 | 2.000 | | | |
| First lens element 3 | Eye-side surface 31 | 27.887 | 9.907 | 19.802 | 1.492 | 57.441 | 22.394 |
| | Display-side surface 32 | -16.147 | 2.046 | 19.848 | | | |
| Second lens element 4 | Eye-side surface 41 | -29.146 | 2.526 | 19.223 | 1.661 | 20.401 | -70.585 |
| | Display-side surface 42 | -79.292 | 22.843 | 17.839 | | | |
| | Display screen 100 | Infinity | | 29.743 | | | |

FIG. 41

| Sur-face | K | $A_2$ | $A_4$ | $A_6$ | $A_8$ |
|---|---|---|---|---|---|
| 31 | 0.000000E+00 | 0.000000E+00 | -4.565000E-06 | 0.000000E+00 | 0.000000E+00 |
| 32 | -9.930552E-01 | 0.000000E+00 | 1.634100E-05 | 0.000000E+00 | 0.000000E+00 |
| 41 | 0.000000E+00 | 0.000000E+00 | 1.295900E-04 | -3.060000E-07 | 0.000000E+00 |
| 42 | 0.000000E+00 | 0.000000E+00 | 1.223540E-04 | -1.920000E-07 | 0.000000E+00 |
| Sur-face | $A_{10}$ | $A_{12}$ | $A_{14}$ | $A_{16}$ | $A_{18}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 42

Longitudinal
spherical aberration
Field of view

Field curvature
(sagittal direction)
Half apparent
field of view (°)

Field curvature
(tangential direction)
Half apparent
field of view (°)

Distortion
Half apparent
field of view (°)

| Tenth embodiment | | | | | | | |
|---|---|---|---|---|---|---|---|
| Effective focal length (EFL)=33.839 mm, Half apparent field of view (ω)=45.000°, Fno=8.460, TTL=38.634 mm, System length(SL)=47.613 mm, Exit pupil diameter(EPD)=4 mm | | | | | | | |
| Lens element | Surface | Radius of curvature (mm) | Thickness (mm) | Effective radius (mm) | Refractive index | Abbe number | Focal length (mm) |
| Observer's Pupil 2 | | Infinity | 8.979 | 2.000 | | | |
| First lens element 3 | Eye-side surface 31 | 32.848 | 6.382 | 14.126 | 1.492 | 57.441 | 23.801 |
| | Display-side surface 32 | -17.100 | 0.658 | 14.945 | | | |
| Second lens element 4 | Eye-side surface 41 | -43.396 | 2.006 | 15.054 | 1.661 | 20.401 | -73.375 |
| | Display-side surface 42 | -393.122 | 29.587 | 14.740 | | | |
| | Display screen 100 | Infinity | | 30.108 | | | |

FIG. 45

| Surface | K | $A_2$ | $A_4$ | $A_6$ | $A_8$ |
|---|---|---|---|---|---|
| 31 | 0.000000E+00 | 0.000000E+00 | -1.155000E-06 | 0.000000E+00 | 0.000000E+00 |
| 32 | -9.909177E-01 | 0.000000E+00 | 1.652200E-05 | 0.000000E+00 | 0.000000E+00 |
| 41 | 0.000000E+00 | 0.000000E+00 | 1.260990E-04 | -3.210000E-07 | 0.000000E+00 |
| 42 | 0.000000E+00 | 0.000000E+00 | 1.242360E-04 | -2.340000E-07 | 0.000000E+00 |
| Surface | $A_{10}$ | $A_{12}$ | $A_{14}$ | $A_{16}$ | $A_{18}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 46

| Eleventh embodiment | | | | | | | |
|---|---|---|---|---|---|---|---|
| Effective focal length (EFL)=40.006 mm, Half apparent field of view (ω)=45.000°, Fno=10.001, TTL=47.125 mm, System length(SL)=62.061 mm, Exit pupil diameter(EPD)=4 mm | | | | | | | |
| Lens element | Surface | Radius of curvature (mm) | Thickness (mm) | Effective radius (mm) | Refractive index | Abbe number | Focal length (mm) |
| Observer's Pupil 2 | | Infinity | 14.935 | 2.000 | | | |
| First lens element 3 | Eye-side surface 31 | 33.478 | 11.433 | 24.880 | 1.492 | 57.441 | 32.134 |
| | Display-side surface 32 | -26.712 | 1.238 | 25.461 | | | |
| Second lens element 4 | Eye-side surface 41 | 175.007 | 2.500 | 25.389 | 1.661 | 20.401 | -127.206 |
| | Display-side surface 42 | 56.778 | 31.954 | 25.568 | | | |
| | Display screen 100 | Infinity | | 29.893 | | | |

FIG. 49

| Sur-face | K | $A_2$ | $A_4$ | $A_6$ | $A_8$ |
|---|---|---|---|---|---|
| 31 | 0.000000E+00 | 0.000000E+00 | -8.176000E-06 | 0.000000E+00 | 0.000000E+00 |
| 32 | -1.013016E+00 | 0.000000E+00 | -2.485000E-06 | 0.000000E+00 | 0.000000E+00 |
| 41 | 0.000000E+00 | 0.000000E+00 | -1.710900E-05 | 4.200000E-08 | 0.000000E+00 |
| 42 | 0.000000E+00 | 0.000000E+00 | -9.800000E-06 | 3.700000E-08 | 0.000000E+00 |
| Sur-face | $A_{10}$ | $A_{12}$ | $A_{14}$ | $A_{16}$ | $A_{18}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 50

| Conditional expression | First embodiment | Second embodiment | Third embodiment | Fourth embodiment | Fifth embodiment | Sixth embodiment |
|---|---|---|---|---|---|---|
| T1 | 6.973 | 7.376 | 6.710 | 10.404 | 9.642 | 9.557 |
| G12 | 0.338 | 0.356 | 0.315 | 2.001 | 2.028 | 1.865 |
| T2 | 1.999 | 1.998 | 1.999 | 1.999 | 2.448 | 2.554 |
| G2D | 29.362 | 29.056 | 29.545 | 24.654 | 22.711 | 22.431 |
| EFL | 33.485 | 33.346 | 33.559 | 32.777 | 30.681 | 30.186 |
| TTL | 38.672 | 38.786 | 38.570 | 39.059 | 36.830 | 36.407 |
| EPD | 4.000 | 4.000 | 4.000 | 4.000 | 4.000 | 4.000 |
| DLD | 60.002 | 60.004 | 59.998 | 64.246 | 61.434 | 59.380 |
| ER | 8.791 | 8.706 | 8.853 | 10.879 | 10.078 | 10.738 |
| SL | 47.463 | 47.492 | 47.423 | 49.938 | 46.908 | 47.145 |
| D1 | 27.742 | 27.520 | 27.934 | 41.594 | 38.470 | 39.658 |
| D2 | 29.980 | 29.980 | 30.008 | 39.268 | 36.746 | 38.328 |
| DLD/EPD | 15.000 | 15.002 | 15.000 | 16.062 | 15.358 | 14.846 |
| EFL/(T1+G12+T2) | 3.597 | 3.427 | 3.719 | 2.275 | 2.173 | 2.160 |
| TTL/G2D | 1.317 | 1.335 | 1.305 | 1.584 | 1.622 | 1.623 |
| T1/T2 | 3.489 | 3.692 | 3.356 | 5.204 | 3.939 | 3.743 |
| (T1+G12)/T2 | 3.659 | 3.871 | 3.514 | 6.205 | 4.767 | 4.473 |
| EFL/T1 | 4.802 | 4.521 | 5.001 | 3.150 | 3.182 | 3.158 |
| EFL/T2 | 16.755 | 16.692 | 16.785 | 16.395 | 12.533 | 11.821 |
| ER/(T1+T2) | 0.980 | 0.929 | 1.016 | 0.877 | 0.834 | 0.887 |
| TTL/(T1+T2) | 4.310 | 4.138 | 4.429 | 3.149 | 3.046 | 3.006 |
| G2D/T2 | 14.692 | 14.544 | 14.777 | 12.332 | 9.277 | 8.784 |
| D1/T1 | 3.978 | 3.731 | 4.163 | 3.998 | 3.990 | 4.150 |
| D2/T2 | 15.001 | 15.007 | 15.009 | 19.642 | 15.010 | 15.009 |

FIG. 51

| Conditional expression | Seventh embod-iment | Eighth embod-iment | Ninth embod-iment | Tenth embod-iment | Eleventh embod-iment |
|---|---|---|---|---|---|
| T1 | 7.201 | 4.898 | 9.907 | 6.382 | 11.433 |
| G12 | 1.805 | 0.489 | 2.046 | 0.658 | 1.238 |
| T2 | 2.018 | 1.303 | 2.526 | 2.006 | 2.500 |
| G2D | 29.743 | 11.930 | 22.843 | 29.587 | 31.954 |
| EFL | 36.213 | 14.902 | 30.417 | 33.839 | 40.006 |
| TTL | 40.768 | 18.620 | 37.323 | 38.634 | 47.125 |
| EPD | 4.000 | 4.000 | 4.000 | 4.000 | 4.000 |
| DLD | 80.000 | 24.000 | 56.108 | 60.196 | 59.492 |
| ER | 8.553 | 4.652 | 10.353 | 8.979 | 14.935 |
| SL | 49.321 | 23.272 | 47.675 | 47.613 | 62.061 |
| D1 | 25.936 | 18.858 | 39.604 | 28.252 | 49.760 |
| D2 | 30.296 | 19.564 | 38.446 | 30.108 | 50.778 |
| DLD/EPD | 20.000 | 6.000 | 14.028 | 15.050 | 14.874 |
| EFL/(T1+G12+T2) | 3.285 | 2.228 | 2.101 | 3.741 | 2.637 |
| TTL/G2D | 1.371 | 1.561 | 1.634 | 1.306 | 1.475 |
| T1/T2 | 3.568 | 3.758 | 3.922 | 3.182 | 4.573 |
| (T1+G12)/T2 | 4.462 | 4.133 | 4.732 | 3.510 | 5.068 |
| EFL/T1 | 5.029 | 3.042 | 3.070 | 5.302 | 3.499 |
| EFL/T2 | 17.942 | 11.434 | 12.041 | 16.870 | 16.002 |
| ER/(T1+T2) | 0.928 | 0.750 | 0.833 | 1.070 | 1.072 |
| TTL/(T1+T2) | 4.422 | 3.003 | 3.002 | 4.606 | 3.382 |
| G2D/T2 | 14.736 | 9.154 | 9.042 | 14.750 | 12.782 |
| D1/T1 | 3.602 | 3.850 | 3.997 | 4.427 | 4.352 |
| D2/T2 | 15.010 | 15.011 | 15.219 | 15.010 | 20.311 |

FIG. 52

OCULAR OPTICAL SYSTEM

CROSS-REFERENCE TO RELATED APPLICATION

This application claims the priority benefit of China application serial no. 201610862324.5, filed on Sep. 29, 2016. The entirety of the above-mentioned patent application is hereby incorporated by reference herein and made a part of this specification.

BACKGROUND OF THE INVENTION

1. Field of the Invention

The invention relates to an optical system, and particularly, to an ocular optical system.

2. Description of Related Art

Virtual Reality (VR) refers to computer technologies used for simulating and generating a three-dimensional virtual world, which enables immersive simulation for users by providing simulations pertaining to visual sensation, auditory sensation and other sensations to users. The currently existing VR devices are mainly focused on visual experiences. Binocular parallax of human eyes is simulated by separated images with two slightly different perspectives corresponding to the left and right eyes to achieve a stereo vision. In order to reduce the volume of the VR device so users can receive a magnified visual sensation from a smaller display screen, an ocular optical system with magnifying capability is now one of major topics in VR research and development.

Because a half apparent field of view is smaller in the existing ocular optical system, an observer may experience narrow vision and low resolution. Moreover, the current ocular optical systems have greater chrominance and distortion, and aberrations are so serious that aberration compensation has to be performed on the display screen before the images are displayed. Accordingly, how to increase the half apparent field of view and enhance the imaging quality becomes one of the issues to be improved.

SUMMARY OF THE INVENTION

The invention is directed to an ocular optical system, which can maintain favorable imaging quality and a large apparent field of view even in the condition that a system length is shortened.

According to an embodiment of the invention, an ocular optical system adapted for imaging an imaging ray entering an eye of an observer via the ocular optical system from a display screen is provided. A side facing towards the eye is an eye-side, and a side facing towards the display screen is a display-side. The ocular optical system includes a first lens element and a second lens element arranged in order from the eye-side to the display-side along an optical axis, and the first lens element and the second lens element respectively include eye-side surfaces facing towards the eye-side and allowing the imaging ray to pass through and display-side surfaces facing towards the display-side and allowing the imaging ray to pass through. A maximum distance between the display-side surface of the first lens element and the eye-side surface of the second lens element parallel to a direction of the optical axis is less than 5 millimeters (mm), and the ocular optical system satisfies: $6 \le DLD/EPD \le 20$, wherein DLD represents a diagonal length of the display screen corresponding to one single pupil of the observer, and EPD is an exit pupil diameter of the ocular optical system.

Based on the above, the ocular optical system provided by the embodiments of the invention can achieve the following advantageous effects. With the designs of the distance between the lens elements, the relationship between the exit pupil diameter and the diagonal length of the display screen of the ocular optical system and the optical parameters, the ocular optical system can be provided with the optical property capable of overcoming the aberrations, maintaining favorable imaging quality and achieving a large apparent field of view even in the condition that the system length is shortened.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 9 shows detailed optical data pertaining to the ocular optical system according to the first embodiment of the invention.

FIG. 10 shows aspheric parameters pertaining to the ocular optical system according to the first embodiment of the invention.

FIG. 13 shows detailed optical data pertaining to the ocular optical system according to the second embodiment of the invention.

FIG. 14 shows aspheric parameters pertaining to the ocular optical system according to the second embodiment of the invention.

FIG. 17 shows detailed optical data pertaining to the ocular optical system according to the third embodiment of the invention.

FIG. 18 shows aspheric parameters pertaining to the ocular optical system according to the third embodiment of the invention.

FIG. 21 shows detailed optical data pertaining to the ocular optical system according to the fourth embodiment of the invention.

FIG. 22 shows aspheric parameters pertaining to the ocular optical system according to the fourth embodiment of the invention.

FIG. 25 shows detailed optical data pertaining to the ocular optical system according to the fifth embodiment of the invention.

FIG. 26 shows aspheric parameters pertaining to the ocular optical system according to the fifth embodiment of the invention.

FIG. 29 shows detailed optical data pertaining to the ocular optical system according to the sixth embodiment of the invention.

FIG. 30 shows aspheric parameters pertaining to the ocular optical system according to the sixth embodiment of the invention.

FIG. 33 shows detailed optical data pertaining to the ocular optical system according to the seventh embodiment of the invention.

FIG. 34 shows aspheric parameters pertaining to the ocular optical system according to the seventh embodiment of the invention.

FIG. 37 shows detailed optical data pertaining to the ocular optical system according to the eighth embodiment of the invention.

FIG. 38 shows aspheric parameters pertaining to the ocular optical system according to the eighth embodiment of the invention.

FIG. 41 shows detailed optical data pertaining to the ocular optical system according to the ninth embodiment of the invention.

FIG. 42 shows aspheric parameters pertaining to the ocular optical system according to the ninth embodiment of the invention.

FIG. 45 shows detailed optical data pertaining to the ocular optical system according to the tenth embodiment of the invention.

FIG. 46 shows aspheric parameters pertaining to the ocular optical system according to the tenth embodiment of the invention.

FIG. 49 shows detailed optical data pertaining to the ocular optical system according to the eleventh embodiment of the invention.

FIG. 50 shows aspheric parameters pertaining to the ocular optical system according to the eleventh embodiment of the invention.

FIG. 51 and FIG. 52 show important parameters and relation values thereof pertaining to the ocular optical system according to the first through the eleventh embodiments of the invention.

DESCRIPTION OF THE EMBODIMENTS

Figure 1:
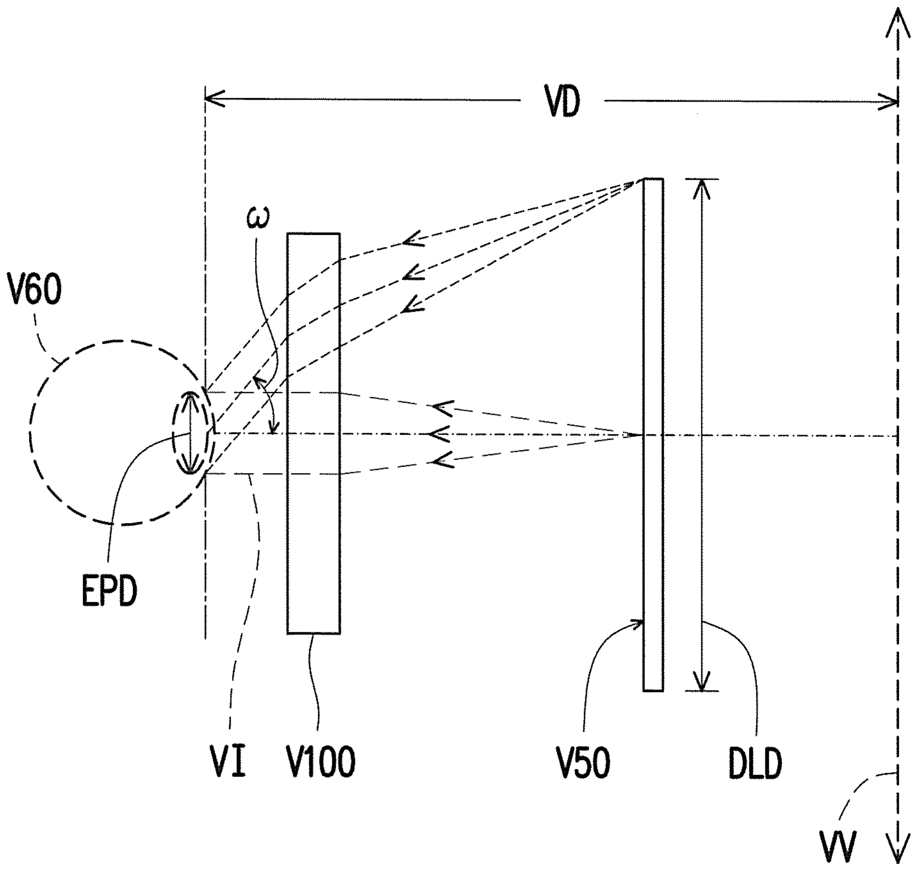
FIG. 1 is a schematic view illustrating an ocular optical system.

In general, a ray direction of an ocular optical system V100 refers to an imaging ray VI which is emitted by a display screen V50, enters an eye V60 via the ocular optical system V100, and is then focused and imaged on a retina of the eye V60 to generate an enlarged virtual image VV within a least distance of distinct vision VD, as depicted in FIG. 1. The following criteria for determining optical specifications of the present application are based on assumption that a reversely tracking of the ray direction is a parallel imaging ray passing through the ocular optical system from an eye-side and focused and imaged on the display screen.

In the present specification, the description "a lens element having positive refracting power (or negative refracting power)" means that the paraxial refracting power of the lens element in Gaussian optics is positive (or negative). The description "an eye-side (or display-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 2 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an ocular optical system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted. The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figure 2:
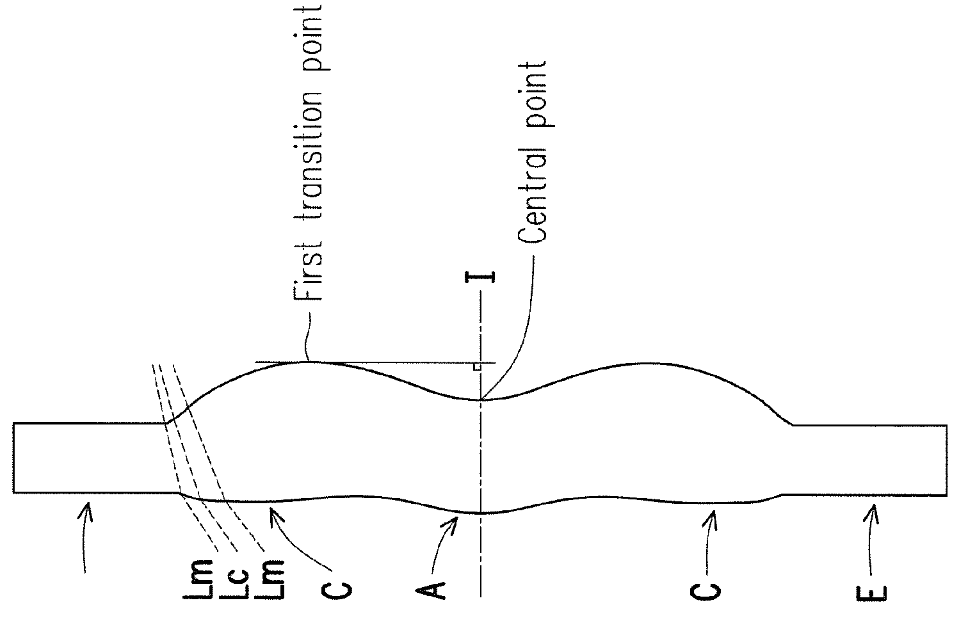
FIG. 2 is a schematic view illustrating a surface structure of a lens element.

1. FIG. 2 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (the farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Figure 3:
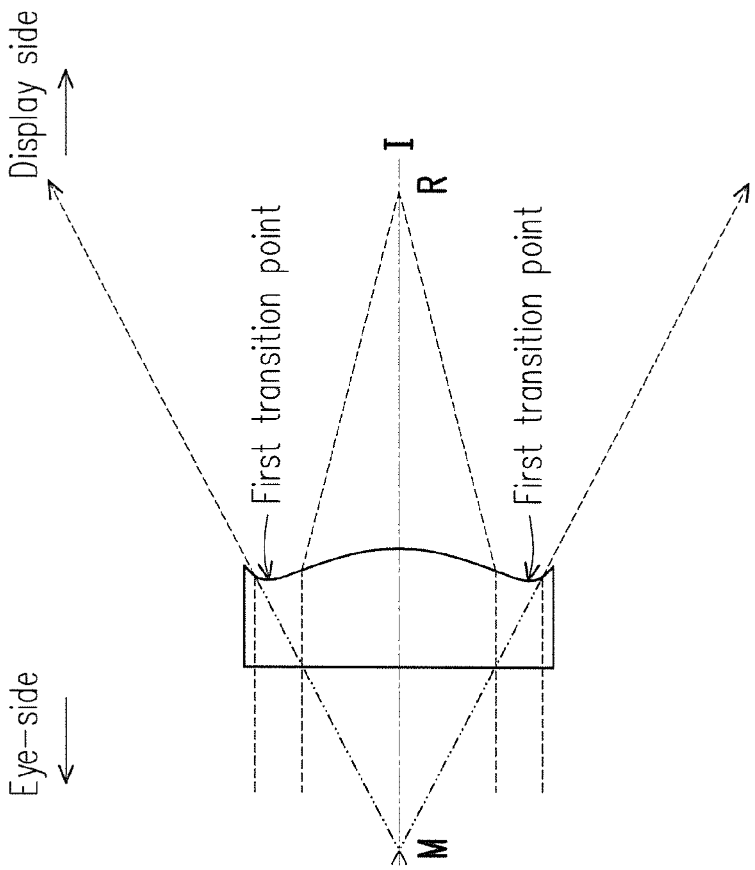
FIG. 3 is a schematic view illustrating a concave and convex surface structure of a lens element and a ray focal point.

2. Referring to FIG. 3, determining the shape of a portion as convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the eye-side or display-side. For instance, if the ray itself intersects the optical axis at the display-side of the lens element after passing through a portion, i.e. the focal point of this ray is at the display-side (see point R in FIG. 3), the portion will be determined as having a convex shape. On the contrary, if the ray diverges after passing through a portion, the extension line of the ray intersects the optical axis at the eye-side of the lens element, i.e. the focal point of the ray is at the eye-side (see point M in FIG. 3), that portion will be determined as having a concave shape. Therefore, referring to FIG. 3, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an eye-side surface, positive R means that the eye-side surface is convex, and negative R means that the eye-side surface is concave. Conversely, for a display-side surface, positive R means that the display-side surface is concave, and negative R means that the display-side surface is convex. The result found by using this method should be consistent as by using the other way mentioned above, which determines surface shapes by referring to whether the focal point of a collimated ray is at the eye-side or the display-side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Figure 4:
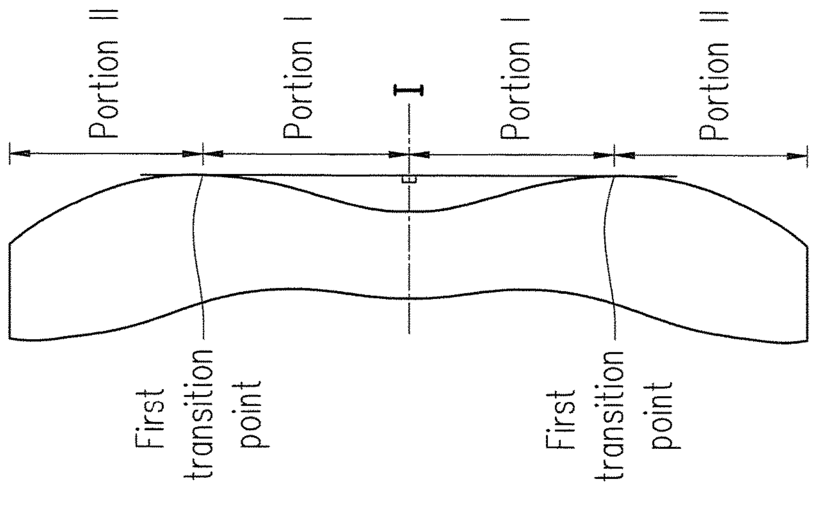
FIG. 4 is a schematic view illustrating a surface structure of a lens element according to a first example.

Referring to the first example depicted in FIG. 4, only one transition point, namely a first transition point, appears within the clear aperture of the display-side surface of the lens element. Portion I is a portion in a vicinity of the optical axis, and portion II is a portion in a vicinity of a periphery of the lens element. The portion in a vicinity of the optical axis is determined as having a concave surface due to the R value at the display-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Figure 5:
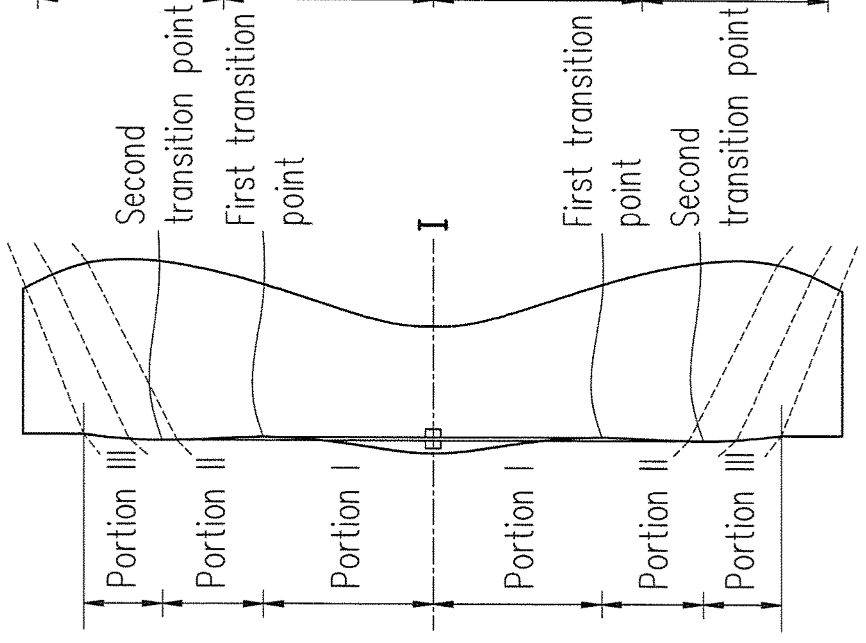
FIG. 5 is a schematic view illustrating a surface structure of a lens element according to a second example.

Referring to the second example depicted in FIG. 5, a first transition point and a second transition point exist on the eye-side surface (within the clear aperture) of a lens element, in which portion I is the portion in a vicinity of the optical axis, and portion III is the portion in a vicinity of a periphery of the lens element. The portion in a vicinity of the optical axis has a convex shape because the R value at the eye-side surface of the lens element is positive. The portion in a vicinity of a periphery of the lens element (portion III) has a convex shape. What is more, there is another portion having a concave shape existing between the first and second transition points (portion II).

Figure 6:
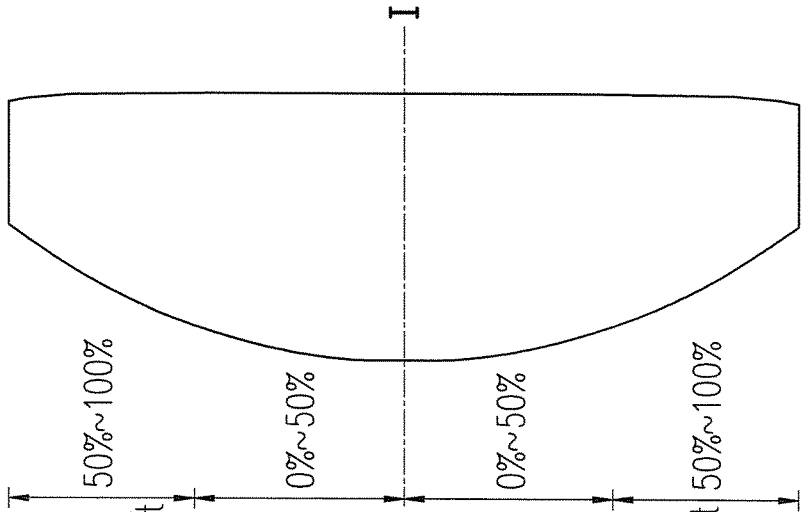
FIG. 6 is a schematic view illustrating a surface structure of a lens element according to a third example.

Referring to a third example depicted in FIG. 6, no transition point exists on the eye-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the eye-side surface of the lens element is determined as having a convex shape due to its positive R value, and the portion in a vicinity of a periphery of the lens element is determined as having a convex shape as well.

Figure 7:
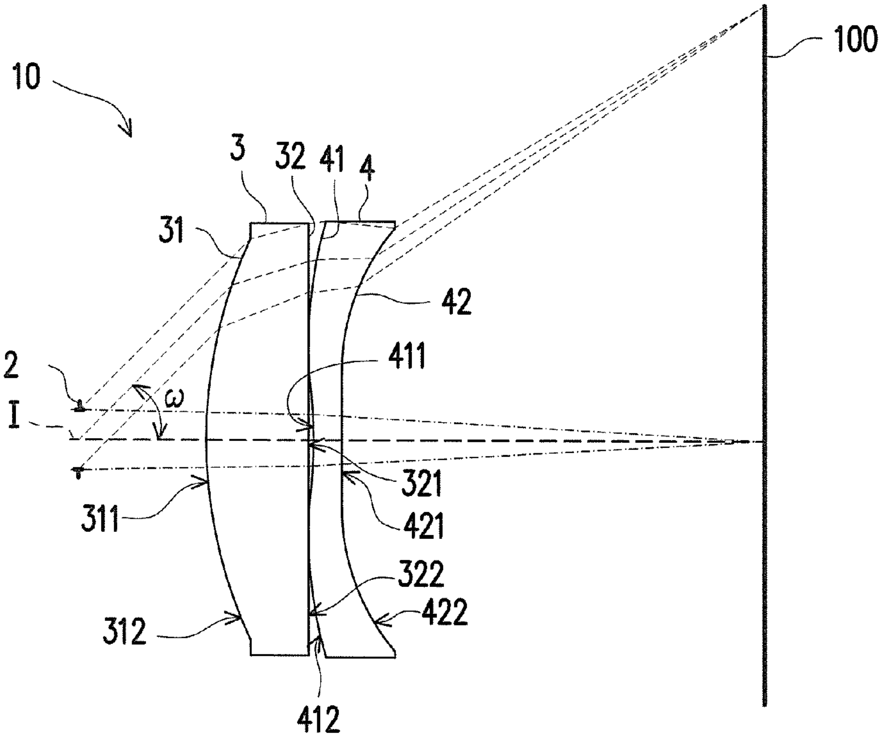
FIG. 7 is a schematic view illustrating an ocular optical system according to a first embodiment of the invention.

FIG. 7 is a schematic view illustrating an ocular optical system according to a first embodiment of the invention, and FIG. 8A to FIG. 8D illustrate a longitudinal spherical aberration and other aberrations of the ocular optical system according to the first embodiment of the invention. Referring to FIG. 7 first, an ocular optical system 10 according to the first embodiment of the invention is adapted for imaging an imaging ray from a display screen 100 which enters an eye of an observer via the ocular optical system 10 and a pupil 2 of the eye of the observer. A side facing towards the eye of the observer is an eye-side, and a side facing towards the display screen 100 is a display-side. In the present embodiment, the ocular optical system 10 includes a first lens element 3 and a second lens element 4 in an order from the eye-side to the display-side along an optical axis I. The imaging ray emitted from the display screen 100 sequentially passes through the second lens element 4 and the first lens element 3 and enters the eye of the observer via the pupil 2. Then, the imaging ray forms an image on the retina of the eye of the observer. Specifically, the first lens element 3 and the second lens element 4 of the ocular optical system 10 respectively include eye-side surfaces 31 and 41 facing towards the eye-side and allowing the imaging ray to pass through and display-side surfaces 32 and 42 facing towards the display-side and allowing the imaging ray to pass through. Additionally, in the present embodiment, a maximum distance between the display-side surface 32 of the first lens element 3 and the eye-side surface 41 of the second lens element 4 parallel to a direction of the optical axis I is less than 5 millimeters (mm).

In order to meet the demand for lighter products, both the first lens element 3 and the second lens element 4 have refracting powers and are made of a plastic material. However, the material of the first lens element 3 and the second lens element 4 is not limited thereto.

The first lens element 3 has a positive refracting power. The eye-side surface 31 of the first lens element 3 is a convex surface, and has a convex portion 311 in a vicinity of the optical axis I and a convex portion 312 in a vicinity of a periphery of the lens element. The display-side surface 32 of the first lens element 3 is a convex surface, and has a convex portion 321 in a vicinity of the optical axis I and a convex portion 322 in a vicinity of the periphery of the lens element. One of the eye-side surface 31 and the display-side surface 32 of the first lens element 3 may be a Fresnel surface, i.e., a surface of a Fresnel lens. In the present embodiment, the eye-side surface 31 of the first lens element 3 is an aspheric surface, and the display-side surface 32 is a Fresnel surface.

The second lens element 4 has a negative refracting power. The eye-side surface 41 of the second lens element 4 has a concave portion 411 in a vicinity of the optical axis I and a convex portion 412 in a vicinity of a periphery of the lens element. The display-side surface 42 of the second lens element 4 has a convex portion 421 in a vicinity of the optical axis I and a concave portion 422 in a vicinity of the periphery of the lens element. In the present embodiment, both the eye-side surface 41 and the display-side surface 42 of the second lens element 4 are aspheric surfaces. Other detailed optical data of the first embodiment is depicted as FIG. 9. In the first embodiment, an effective focal length (EFL) of the ocular optical system 10 in whole is 33.485 mm, a half apparent field of view (ω) is 45.000°, and an f-number (Fno) is 8.371. Specifically, the "Fno" referred to in the present specification is calculated based on the principle of light reversibility, in which the eye-side is considered as an object-side, the display-side is considered as an image-side, and the pupil of the eye of the observer is considered as a pupil of incident light. Moreover, an effective radius in FIG. 9 refers to a half of an effective diameter.

Furthermore, in the first embodiment, an exit pupil diameter (EPD) of the ocular optical system 10 corresponds to a diameter of the pupil 2 of the observer, as depicted in FIG. 1. In the present embodiment, EPD of the ocular optical system 10 is 4 mm. Additionally, TTL of the ocular optical system is 38.672 mm, and a system length (SL) thereof is 47.463 mm. TTL represents a distance from the eye-side surface 31 of the first lens element 3 to the display screen 100 along the optical axis I, and SL represents a distance from the pupil 2 of the observer to the display screen 100 along the optical axis I.

In the present embodiment, the tree surfaces, i.e., the eye-side surface 31 of the first lens element 3, and the eye-side surface 41 and the display-side surface 42 of the second lens element 4, are all aspheric surfaces, and the display-side surface 32 of the first lens element 3 is a Fresnel surface, where an arc surface of each tooth (which is a curved surface on each tooth for effectively refracting the imaging ray) of the Fresnel surface is an aspheric surface. The arc surface of each tooth is represented by an aspherical coefficient of the display-side surface 32 below, and the aspheric surfaces are defined by a formula as follows:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}, \qquad (1)$$

wherein

Y: a vertical distance from a point on an aspheric curve to the optical axis I;

Z: a depth of the aspheric surface (a vertical distance between the point on the aspheric surface that is spaced from the optical axis I by the distance Y and a tangent plane tangent to a vertex of the aspheric surface on the optical axis I);

R: a curvature radius of the surface of the lens element close to the optical axis K: a conic constant; and $a_{2i}$: the 2ith aspheric coefficient.

Each aspheric coefficient from the eye-side surface 31 of the first lens element 3 to the display-side surface 42 of the second lens element 4 in the formula (1) is indicated in FIG. 10. In FIG. 10, the referential number 31 is one column that represents the aspheric coefficient of the eye-side surface 31 of the first lens element 3, and the reference numbers in other columns can be deduced from the above.

Additionally, the relationship among the important parameters pertaining to the ocular optical system 10 of the first embodiment is indicated in FIG. 51, wherein, EFL represents the a system focal length of the ocular optical system 10;

ω represents the half apparent field of view of the ocular optical system 10, i.e., a half of an angle of view of the observer, as depicted in FIG. 1;

T1 represents a thickness of the first lens element 3 along the optical axis I;

T2 represents a thickness of the second lens element 4 along the optical axis I;

G12 represents a distance from the display-side surface 32 of the first lens element 3 to the eye-side surface 41 of the second lens element 4 along the optical axis I, i.e., an air gap from the first lens element 3 to the second lens element 4 along the optical axis I;

G2D represents a distance from the display-side surface 42 of the second lens element 4 to the display screen 100 along the optical axis I, i.e., an air gap from the second lens element 4 to the display screen 100 along the optical axis I;

TTL represents a distance from the eye-side surface 31 of the first lens element 3 to the display screen 100 along the optical axis I;

ER represents an eye relief, which is a distance from the pupil 2 of the observer to the eye-side surface of first lens element 3 along the optical axis I;

SL represents a system distance from the pupil 2 of the observer to the display screen 100 along the optical axis I;

EPD represents an exit pupil diameter of the ocular optical system 10 corresponding to a diameter of the pupil 2 of the observer (generally, for a human eye, the pupil 2 of the observer is approximately 3 mm during the day and approximately 7 mm during the night, as depicted in FIG. 1);

DLD represents a diagonal length of the display screen 100 corresponding to one single pupil 2 of the observer, as depicted in FIG. 1;

a least distance of distinct vision represents the closest distance that the eye is able to clearly focus on, which is normally 250 mm for young people, e.g., the least distance of distinct vision VD depicted in FIG. 1;

D1 is an optical effective diameter of the eye-side surface 31 of the first lens element 3; and D2 is an optical effective diameter of the eye-side surface 41 of the second lens element 4.

Furthermore, it is further defined that:

n1 is a refractive index of the first lens element 3;

n2 is a refractive index of the second lens element 4;

V1 is an Abbe number of the first lens element 3; and

V2 is an Abbe number of the second lens element 4.

Further, referring to FIG. 8A to FIG. 8D, FIG. 8A to FIG. 8D illustrate the aberrations of the ocular optical system according to the first embodiment, which are the aberrations obtained based on the assumption that the reversely tracking of the ray direction is a parallel imaging ray from the eye-side which sequentially passes through the pupil 2 and the ocular optical system 10 and is focused and imaged on the display screen 100. In the present embodiment, each aberration behavior shown in each of the aberration diagrams can decide the corresponding aberration behavior for the imaging ray from the display scree 100 imaged on the retina of the eye of the observer. In other words, when the aberration presented in each of the aberration diagrams is smaller, each aberration behavior with respect to the image on the retina of the eye of the observer may also be smaller, such that the observer can observe the image with better imaging quality.

Figures 8A, 8B, 8C, 8D:
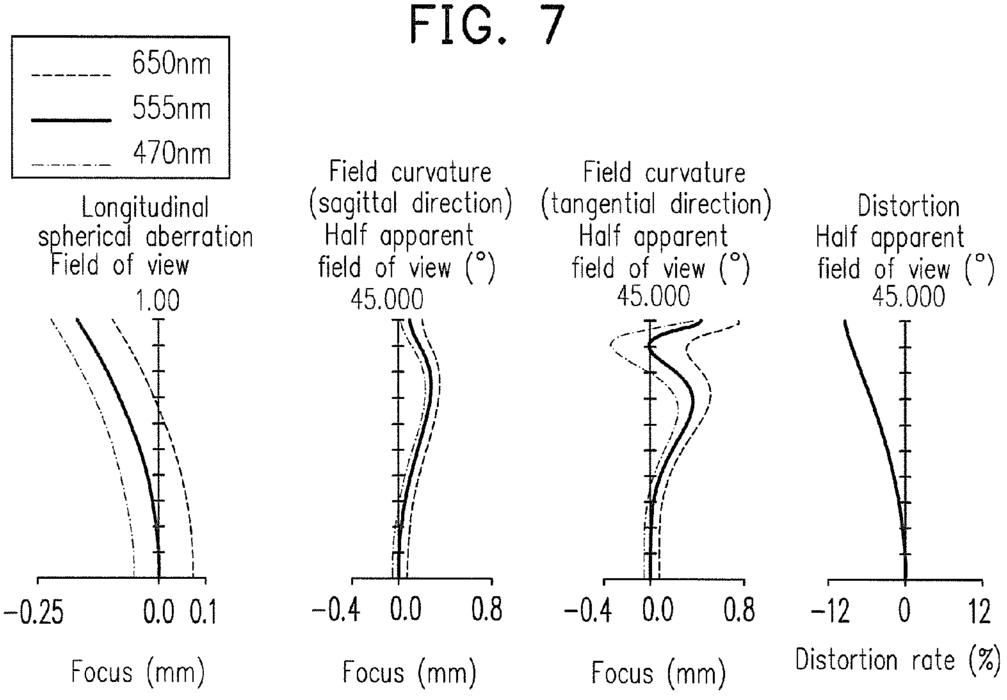
FIG. 8A to FIG. 8D illustrate a longitudinal spherical aberration and other aberrations of the ocular optical system according to the first embodiment of the invention.

Specifically, FIG. 8A illustrates the longitudinal spherical aberration of the first embodiment, FIG. 8B and FIG. 8C respectively illustrate a field curvature aberration in a sagittal direction and a field curvature aberration in a tangential direction of the first embodiment, and FIG. 8D illustrates a distortion aberration of the first embodiment. FIG. 8A which illustrates the longitudinal spherical aberration of the first embodiment is simulated when the pupil radius is 2.0000 mm. Additionally, in FIG. 8A which illustrates the longitudinal spherical aberration of the first embodiment, the curve of each wavelength is close to one another and approaches the center position, which indicates that the off-axis ray of each wavelength at different heights is concentrated around the imaging point. According to the skew margin of the curve of each wavelength, the imaging point deviation of the off-axis ray at different heights is controlled within a range of ±0.25 mm. Hence, it is evident that the spherical aberration of the same wavelength can be significantly improved according to the present embodiment. In addition, distances among the three types of representative wavelengths (which are respectively 650 nanometers (nm), 555 nm and 470 nm) are close to one another, which indicates that imaging positions of the rays with different wavelengths are quite concentrated, and therefore, the chromatic aberration can be significantly improved as well.

In the two field curvature aberrations illustrated in FIG. 8B and FIG. 8C, the focal length variations of the three type of representative wavelengths within the entire field of view falls within a range of ±0.8 mm, which indicates that aberration can be effectively eliminated by the ocular optical system 10 of the first embodiment. The diagram of the distortion aberration illustrated in FIG. 8D shows that the distortion aberration of the first embodiment can be maintained within a range of ±12%, which indicates that the distortion aberration of the first embodiment can comply with the imaging quality requirement of the optical system. Accordingly, as being compared with the existing ocular optical systems, the ocular optical system of the first embodiment still can provide the favorable imaging quality in the condition that the system length is shortened to about 47.463 mm. As a result, the first embodiment can carry out the slim product design by shortening the ocular optical system in the condition that favorable optical properties are maintained. In addition, the ocular optical system 10 of the first embodiment has a large apparent field of view, and is capable of correcting the aberration to maintain favorable imaging quality.

Figure 11:
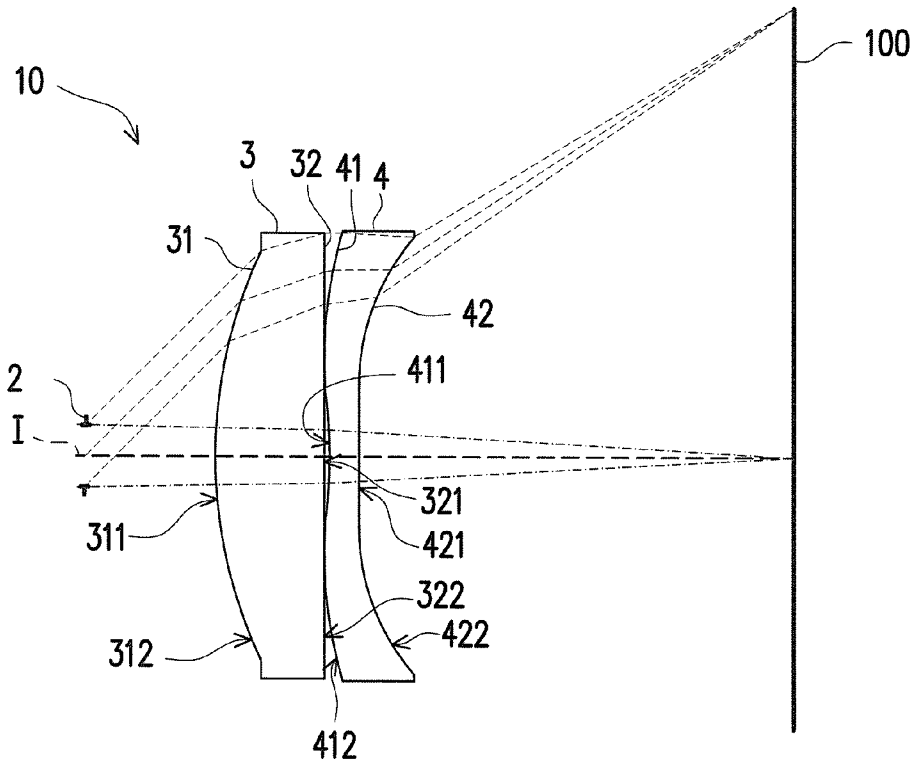
FIG. 11 is a schematic view illustrating an ocular optical system according to a second embodiment of the invention.

FIG. 11 is a schematic view illustrating an ocular optical system lens according to a second embodiment of the invention, and FIG. 12A to FIG. 12D illustrate a longitudinal spherical aberration and other aberrations of the ocular optical system according to the second embodiment of the invention. Referring to FIG. 11 first, the ocular optical system 10 provided by the second embodiment of the invention is substantially similar to that provided by the first embodiment, where only the optical data, the aspheric coefficients, and the parameters of the lens elements 3 and 4 in the two embodiments are different to some extent. It should be noted that for clear illustration, part of the reference numbers of the concave and the convex portions same as those in the first embodiment are omitted in FIG. 11.

Detailed optical data of the ocular optical system 10 is depicted as FIG. 13. In the second embodiment, EFL of the ocular optical system 10 in whole is 33.346 mm, ω is 45.000°, Fno is 8.336, EPD is 4 mm, TTL is 38.786 mm, and SL is 47.492 mm.

Referring to FIG. 14, the aspheric coefficients from the eye-side surface 31 of the first lens element 3 to the display-side surface 42 of the second lens element 4 in the formula (1) according to the second embodiment are illustrated.

Additionally, the relationship among the important parameters pertaining to the ocular optical system 10 of the second embodiment is indicated in FIG. 51.

Figures 12A, 12B, 12C, 12D:
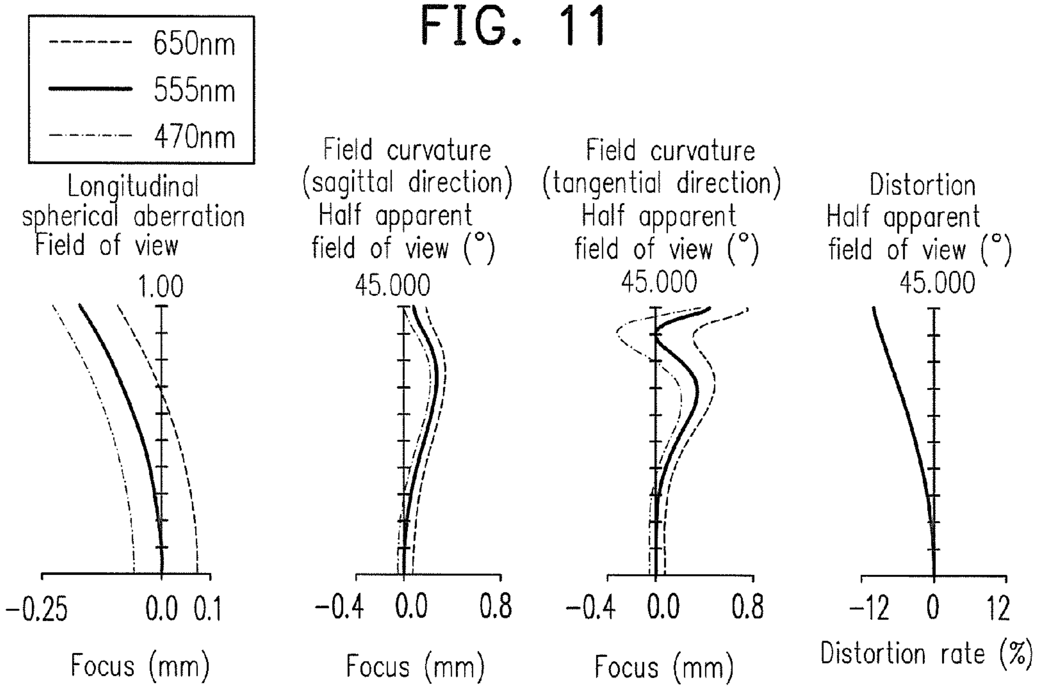
FIG. 12A to FIG. 12D illustrate a longitudinal spherical aberration and other aberrations of the ocular optical system according to the second embodiment of the invention.

FIG. 12A which illustrates the longitudinal spherical aberration of the second embodiment is simulated when the pupil radius is 2.0000 mm. In FIG. 12A which illustrates the longitudinal spherical aberration of the second embodiment, the imaging point deviation of the off-axis ray at different heights is controlled within a range of +0.25 mm. In the two field curvature aberrations illustrated in FIG. 12B and FIG. 12C, the focal length variations of the three type of representative wavelengths within the entire field of view falls within a range of +0.8 mm. The diagram of the distortion aberration illustrated in FIG. 12D shows that the distortion aberration of the second embodiment can be maintained within a range of ±12%. Accordingly, as being compared with the existing ocular optical systems, the ocular optical system of the second embodiment still can provide the favorable imaging quality in the condition that the system length is shortened to about 47.492 mm.

According to the above description, the second embodiment in comparison with the first embodiment has advantages as follows. The Fno of the second embodiment is less than that of the first embodiment. In addition, the second embodiment is easier to be manufactured than the first embodiment and thus has higher yield.

Figure 15:
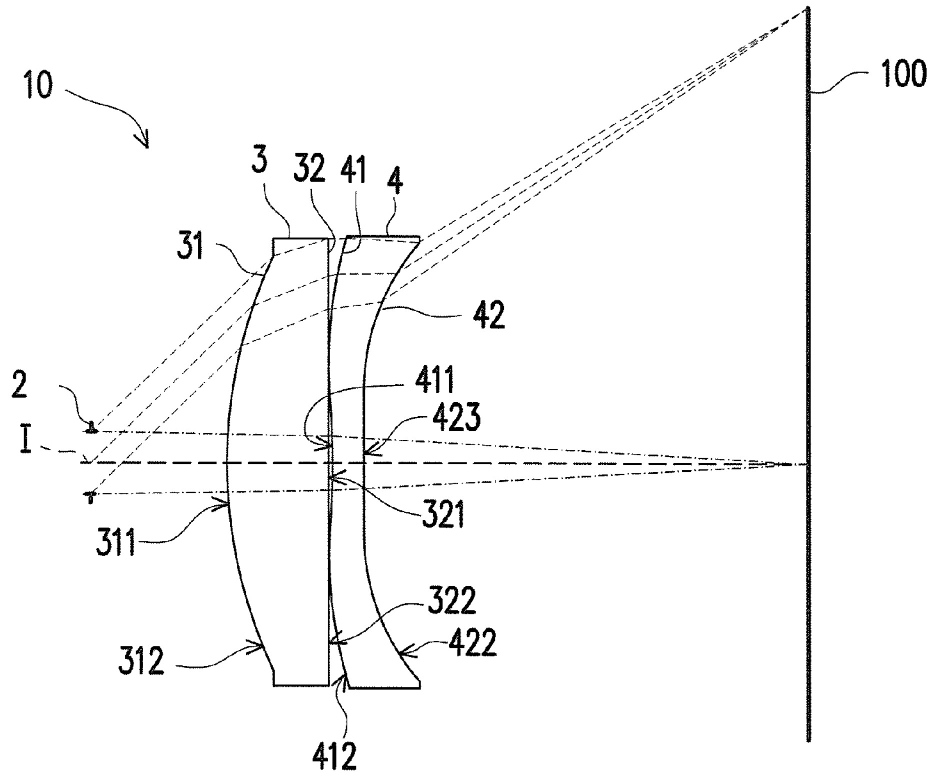
FIG. 15 is a schematic view illustrating an ocular optical system according to a third embodiment of the invention.

FIG. 15 is a schematic view illustrating an ocular optical system according to a third embodiment of the invention, and FIG. 16A to FIG. 16D illustrate a longitudinal spherical aberration and other aberrations of the ocular optical system according to the third embodiment of the invention. Referring to FIG. 15 first, the ocular optical system 10 provided by the third embodiment of the invention is substantially similar to that provided by the first embodiment, where only the optical data, the aspheric coefficients, and the parameters of the lens elements 3 and 4 in the two embodiments are different to some extent. In the present embodiment, the display-side surface 42 of the second lens element 4 is a concave surface, and has a concave portion 423 in a vicinity of the optical axis I and a concave portion 422 in a vicinity of a periphery of the lens element. It should be noted that for clear illustration, part of the reference numbers of the concave and the convex portions same as those in the first embodiment are omitted in FIG. 15.

Detailed optical data of the ocular optical system 10 is depicted as FIG. 17. In the third embodiment, EFL of the ocular optical system 10 in whole is 33.559 mm, ω is 45.000°, Fno is 8.390, EPD is 4 mm, TTL is 38.570 mm, and SL is 47.423 mm.

Referring to FIG. 18, the aspheric coefficients from the eye-side surface 31 of the first lens element 3 to the display-side surface 42 of the second lens element 4 in the formula (1) according to the third embodiment are illustrated.

Additionally, the relationship among the important parameters pertaining to the ocular optical system 10 of the third embodiment is indicated in FIG. 51.

Figures 16A, 16B, 16C, 16D:
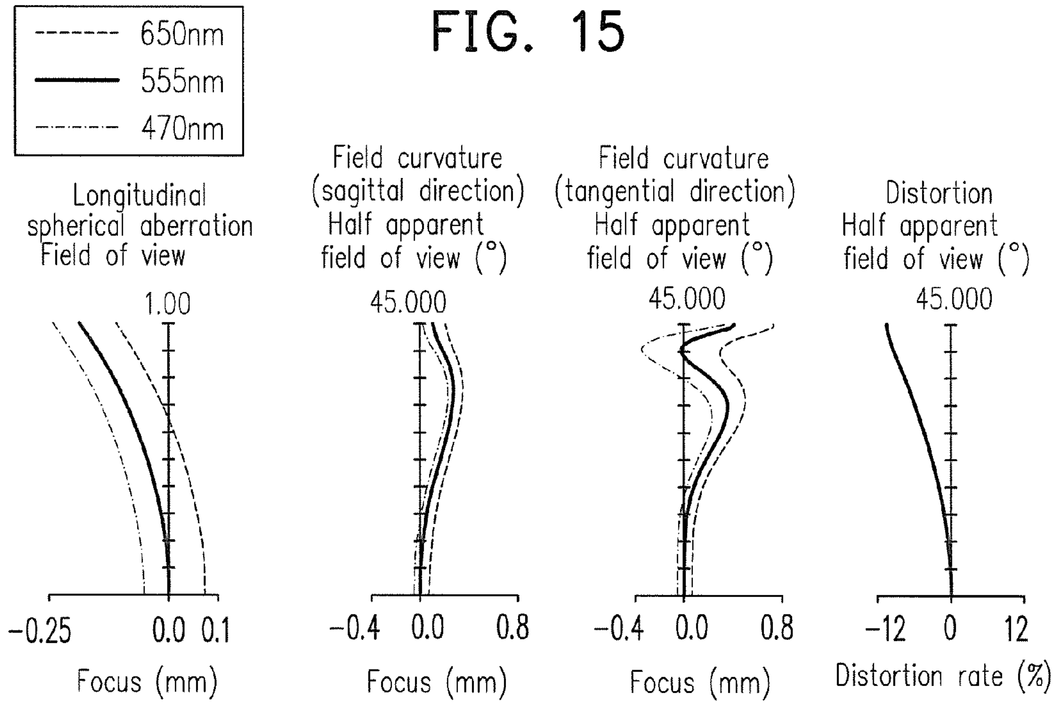
FIG. 16A to FIG. 16D illustrate a longitudinal spherical aberration and other aberrations of the ocular optical system according to the third embodiment of the invention.

FIG. 16A which illustrates the longitudinal spherical aberration of the third embodiment is simulated when the pupil radius is 2.0000 mm. In FIG. 16A which illustrates the longitudinal spherical aberration of the third embodiment, the imaging point deviation of the off-axis ray at different heights is controlled within a range of ±0.25 mm. In the two field curvature aberrations illustrated in FIG. 16B and FIG. 16C, the focal length variations of the three type of representative wavelengths within the entire field of view falls within a range of ±0.8 mm. The diagram of the distortion aberration illustrated in FIG. 16D shows that the distortion aberration of the second embodiment can be maintained within a range of ±12%. Accordingly, as being compared with the existing ocular optical systems, the ocular optical system of the third embodiment still can provide the favorable imaging quality in the condition that the system length is shortened to about 47.423 mm.

According to the above description, the third embodiment in comparison with the first embodiment has advantages as follows. The system length SL of the third embodiment is less than that of the first embodiment.

Figure 19:
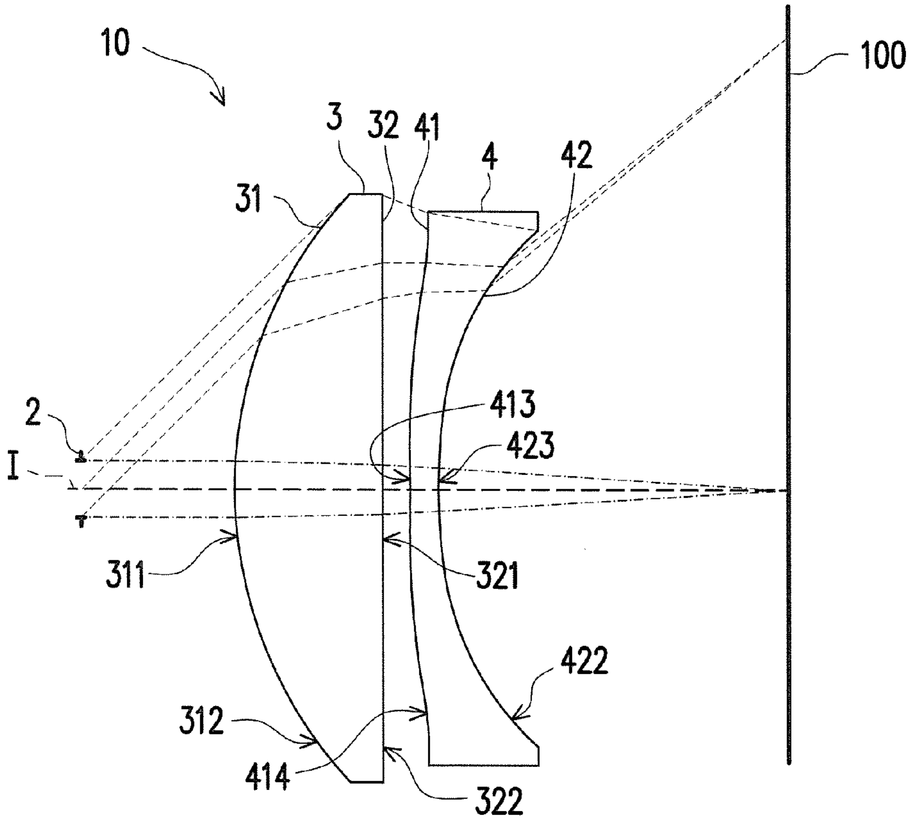
FIG. 19 is a schematic view illustrating an ocular optical system according to a fourth embodiment of the invention.

FIG. 19 is a schematic view illustrating an ocular optical system according to a fourth embodiment of the invention, and FIG. 20A to FIG. 20D illustrate a longitudinal spherical aberration and other aberrations of the ocular optical system according to the fourth embodiment of the invention. Referring to FIG. 19 first, the ocular optical system 10 provided by the fourth embodiment of the invention is substantially similar to that provided by the first embodiment, where only the optical data, the aspheric coefficients, and the parameters of the lens elements 3 and 4 in the two embodiments are different to some extent. In the present embodiment, the eye-side surface surface 41 of the second lens element 4 has convex portion 413 in a vicinity of the optical axis I and a concave portion 414 in a vicinity of a periphery of the lens element. The display-side surface 42 of the second lens element 4 is a concave surface, and has a concave portion 423 in a vicinity of the optical axis I and a concave portion 422 in a vicinity of the periphery of the lens element. It should be noted that for clear illustration, part of the reference numbers of the concave and the convex portions same as those in the first embodiment are omitted in FIG. 19.

Detailed optical data of the ocular optical system 10 is depicted as FIG. 21. In the fourth embodiment, EFL of the ocular optical system 10 in whole is 32.777 mm, ω is 45.000°, Fno is 8.194, EPD is 4 mm, TTL is 39.059 mm, and SL is 49.938 mm.

Referring to FIG. 22, the aspheric coefficients from the eye-side surface 31 of the first lens element 3 to the display-side surface 42 of the second lens element 4 in the formula (1) according to the fourth embodiment are illustrated.

Additionally, the relationship among the important parameters pertaining to the ocular optical system 10 of the fourth embodiment is indicated in FIG. 51.

Figures 20A, 20B, 20C, 20D:
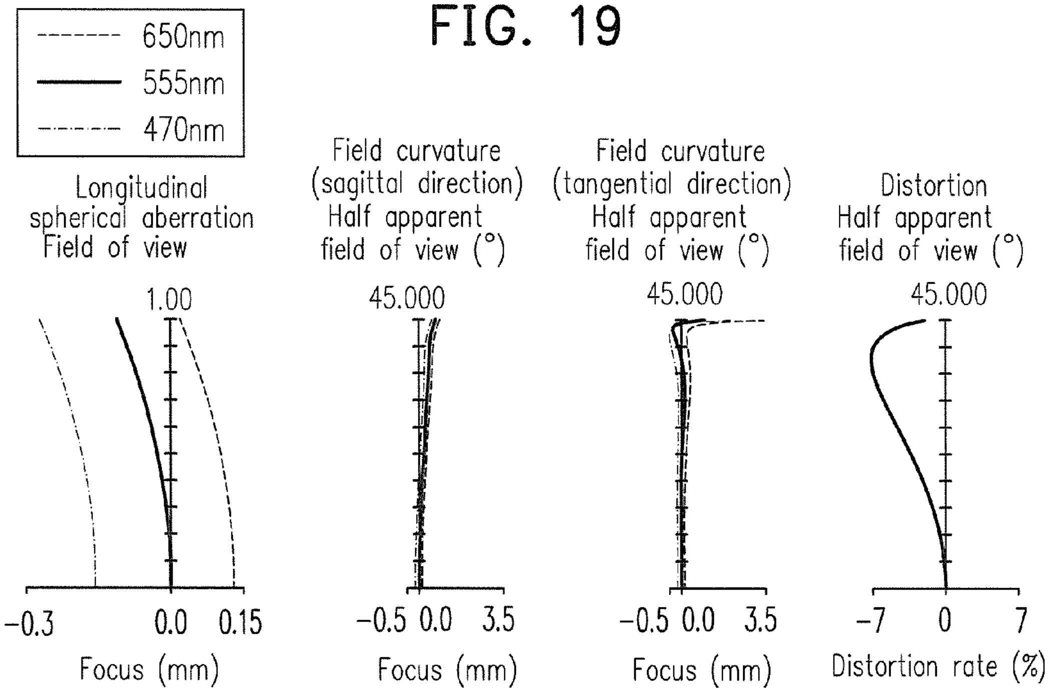
FIG. 20A to FIG. 20D illustrate a longitudinal spherical aberration and other aberrations of the ocular optical system according to the fourth embodiment of the invention.

FIG. 20A which illustrates the longitudinal spherical aberration of the fourth embodiment is simulated when the pupil radius is 2.0000 mm. In FIG. 20A which illustrates the longitudinal spherical aberration of the fourth embodiment, the imaging point deviation of the off-axis ray at different heights is controlled within a range of ±0.3 mm. In the two field curvature aberrations illustrated in FIG. 20B and FIG. 20C, the focal length variations of the three type of representative wavelengths within the entire field of view falls within a range of ±3.5 mm. The diagram of the distortion aberration illustrated in FIG. 20D shows that the distortion aberration of the fourth embodiment can be maintained within a range of ±7%. Accordingly, as being compared with the existing ocular optical systems, the ocular optical system of the fourth embodiment still can provide the favorable imaging quality in the condition that the system length is shortened to about 49.938 mm.

According to the above description, the fourth embodiment in comparison with the first embodiment has advantages as follows. The Fno of the fourth embodiment is less than that of the first embodiment. Additionally, the range of the distortion aberration of the fourth embodiment is smaller than the range of the distortion aberration of the first embodiment.

Figure 23:
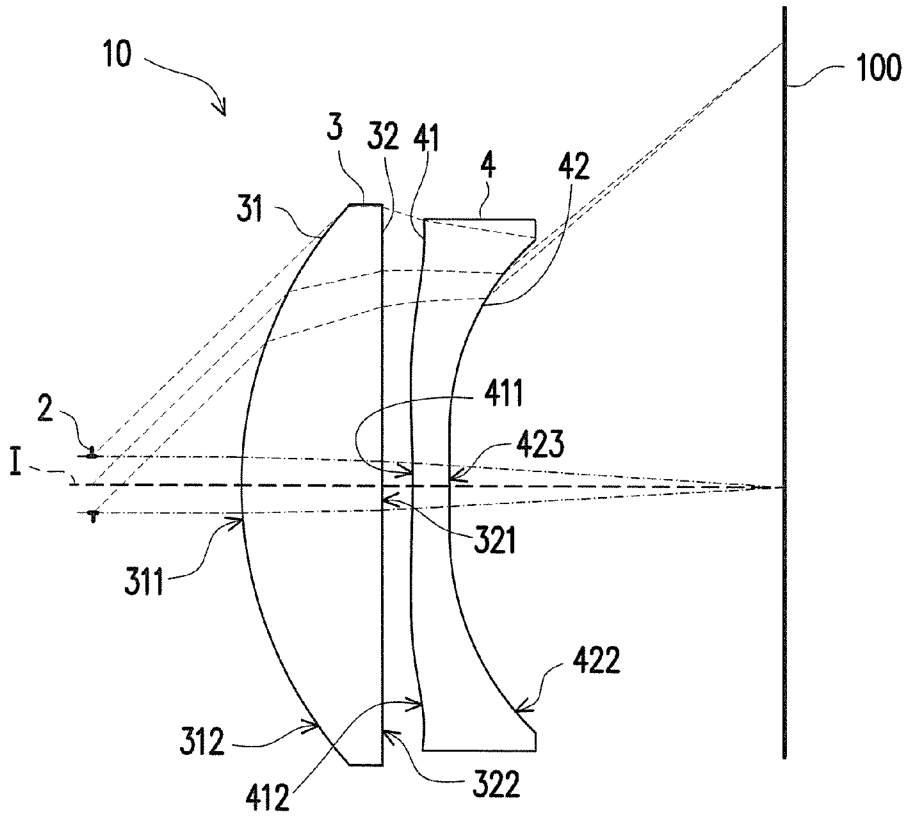
FIG. 23 is a schematic view illustrating an ocular optical system according to a fifth embodiment of the invention.

FIG. 23 is a schematic view illustrating an ocular optical system according to a fifth embodiment of the invention, and FIG. 24A to FIG. 24D illustrate a longitudinal spherical aberration and other aberrations of the ocular optical system according to the fifth embodiment of the invention. Referring to FIG. 23 first, the ocular optical system 10 provided by the fifth embodiment of the invention is substantially similar to that provided by the first embodiment, where only the optical data, the aspheric coefficients, and the parameters of the lens elements 3 and 4 in the two embodiments are different to some extent. In the present embodiment, the display-side surface 42 of the second lens element 4 is a concave surface, and has a concave portion 423 in a vicinity of the optical axis I and a concave portion 422 in a vicinity of a periphery of the lens element. It should be noted that for clear illustration, part of the reference numbers of the concave and the convex portions same as those in the first embodiment are omitted in FIG. 23.

Detailed optical data of the ocular optical system 10 is depicted as FIG. 25. In the fifth embodiment, EFL of the ocular optical system 10 in whole is 30.681 mm, ω is 45.000°, Fno is 7.670, EPD is 4 mm, TTL is 36.830 mm, and SL is 46.908 mm.

Referring to FIG. 26, the aspheric coefficients from the eye-side surface 31 of the first lens element 3 to the display-side surface 42 of the second lens element 4 in the formula (1) according to the fifth embodiment are illustrated.

Additionally, the relationship among the important parameters pertaining to the ocular optical system 10 of the fifth embodiment is indicated in FIG. 51.

Figures 24A, 24B, 24C, 24D:
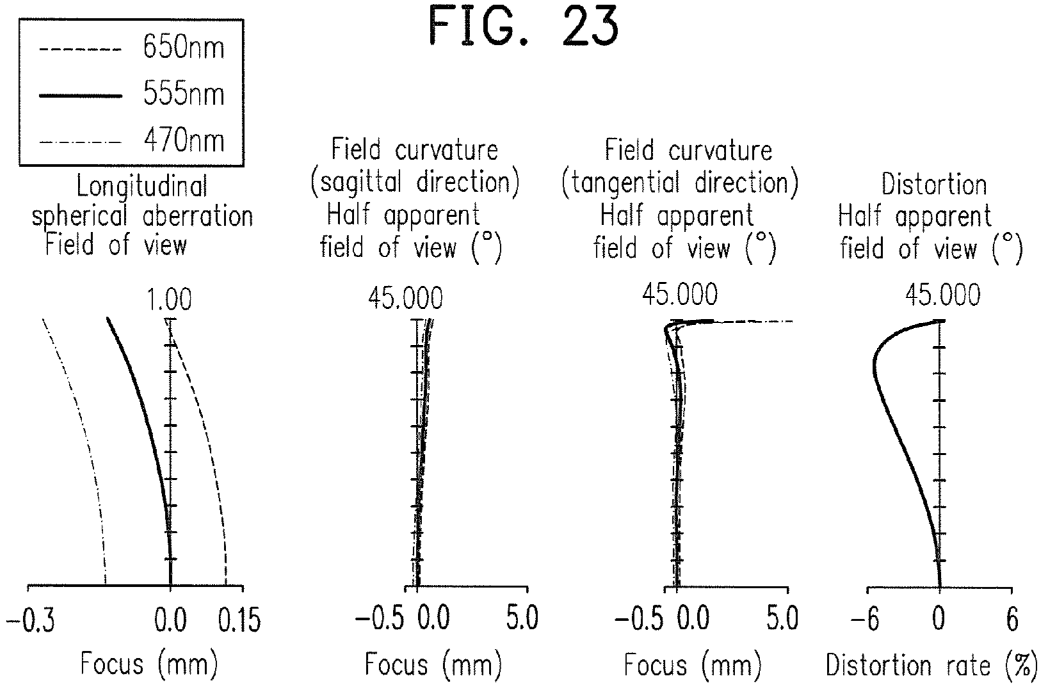
FIG. 24A to FIG. 24D illustrate a longitudinal spherical aberration and other aberrations of the ocular optical system according to the fifth embodiment of the invention.

FIG. 24A which illustrates the longitudinal spherical aberration of the fifth embodiment is simulated when the pupil radius is 2.0000 mm. In FIG. 24A which illustrates the longitudinal spherical aberration of the fifth embodiment, the imaging point deviation of the off-axis ray at different heights is controlled within a range of ±0.3 mm. In the two field curvature aberrations illustrated in FIG. 24B and FIG. 24C, the focal length variations of the three type of representative wavelengths within the entire field of view falls within a range of ±5.0 mm. The diagram of the distortion aberration illustrated in FIG. 24D shows that the distortion aberration of the fifth embodiment can be maintained within a range of ±6%. Accordingly, as being compared with the existing ocular optical systems, the ocular optical system of the fifth embodiment still can provide the favorable imaging quality in the condition that the system length is shortened to about 46.908 mm.

According to the above description, the fifth embodiment in comparison with the first embodiment has advantages as follows. The system length SL of the fifth embodiment is less than that of the first embodiment. The Fno of the fifth embodiment is less than that of the first embodiment. The range of the distortion aberration of the fifth embodiment is smaller than the range of the distortion aberration of the first embodiment. In addition, the fifth embodiment is easier to be manufactured than the first embodiment and thus has higher yield.

Figure 27:
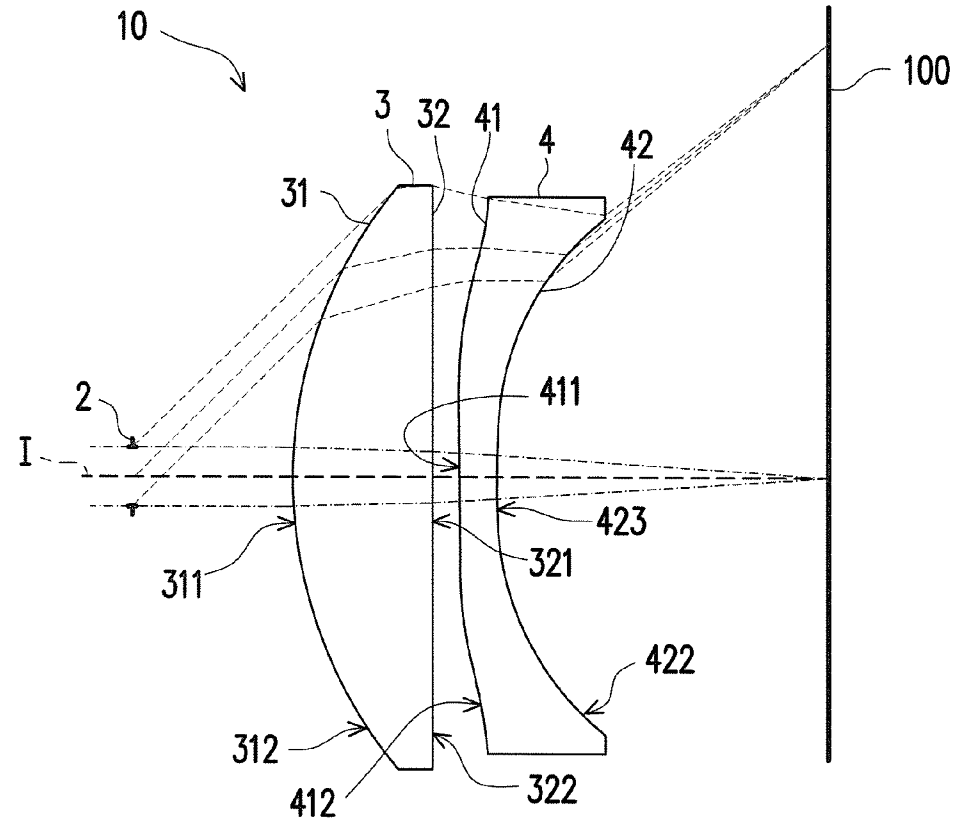
FIG. 27 is a schematic view illustrating an ocular optical system according to a sixth embodiment of the invention.

FIG. 27 is a schematic view illustrating an ocular optical system according to a sixth embodiment of the invention, and FIG. 28A to FIG. 28D illustrate a longitudinal spherical aberration and other aberrations of the ocular optical system according to the sixth embodiment of the invention. Referring to FIG. 27 first, the ocular optical system 10 provided by the sixth embodiment of the invention is substantially similar to that provided by the first embodiment, where only the optical data, the aspheric coefficients, and the parameters of the lens elements 3 and 4 in the two embodiments are different to some extent. In the present embodiment, the display-side surface 42 of the second lens element 4 is a concave surface, and has a concave portion 423 in a vicinity of the optical axis I and a concave portion 422 in a vicinity of a periphery of the lens element. It should be noted that for clear illustration, part of the reference numbers of the concave and the convex portions same as those in the first embodiment are omitted in FIG. 27.

Detailed optical data of the ocular optical system 10 is depicted as FIG. 29. In the sixth embodiment, EFL of the ocular optical system 10 in whole is 30.186 mm, ω is 45.000°, Fno is 7.546, EPD is 4 mm, TTL is 36.407 mm, and SL is 47.145 mm.

Referring to FIG. 30, the aspheric coefficients from the eye-side surface 31 of the first lens element 3 to the display-side surface 42 of the second lens element 4 in the formula (1) according to the sixth embodiment are illustrated.

Additionally, the relationship among the important parameters pertaining to the ocular optical system 10 of the sixth embodiment is indicated in FIG. 51.

Figures 28A, 28B, 28C, 28D:
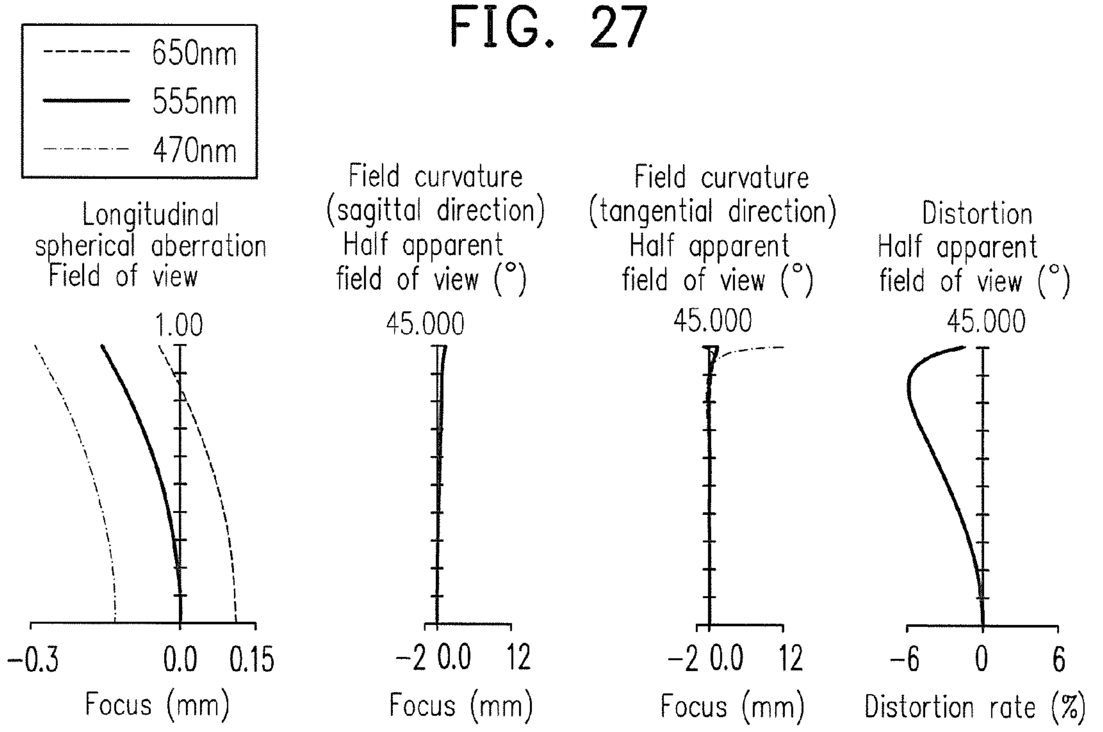
FIG. 28A to FIG. 28D illustrate a longitudinal spherical aberration and other aberrations of the ocular optical system according to the sixth embodiment of the invention.

FIG. 28A which illustrates the longitudinal spherical aberration of the fifth embodiment is simulated when the pupil radius is 2.0000 mm. In FIG. 28A which illustrates the longitudinal spherical aberration of the sixth embodiment, the imaging point deviation of the off-axis ray at different heights is controlled within a range of ±0.3 mm. In the two field curvature aberrations illustrated in FIG. 28B and FIG. 28C, the focal length variations of the three type of representative wavelengths within the entire field of view falls within a range of ±12 mm. The diagram of the distortion aberration illustrated in FIG. 28D shows that the distortion aberration of the sixth embodiment can be maintained within a range of ±6%. Accordingly, as being compared with the existing ocular optical systems, the ocular optical system of the sixth embodiment still can provide the favorable imaging quality in the condition that the system length is shortened to about 47.145 mm.

According to the above description, the sixth embodiment in comparison with the first embodiment has advantages as follows. The system length SL of the sixth embodiment is less than that of the first embodiment. The Fno of the sixth embodiment is less than that of the first embodiment. The range of the distortion aberration of the sixth embodiment is smaller than the range of the distortion aberration of the first embodiment. In addition, the sixth embodiment is easier to be manufactured than the first embodiment and thus has higher yield.

Figure 31:
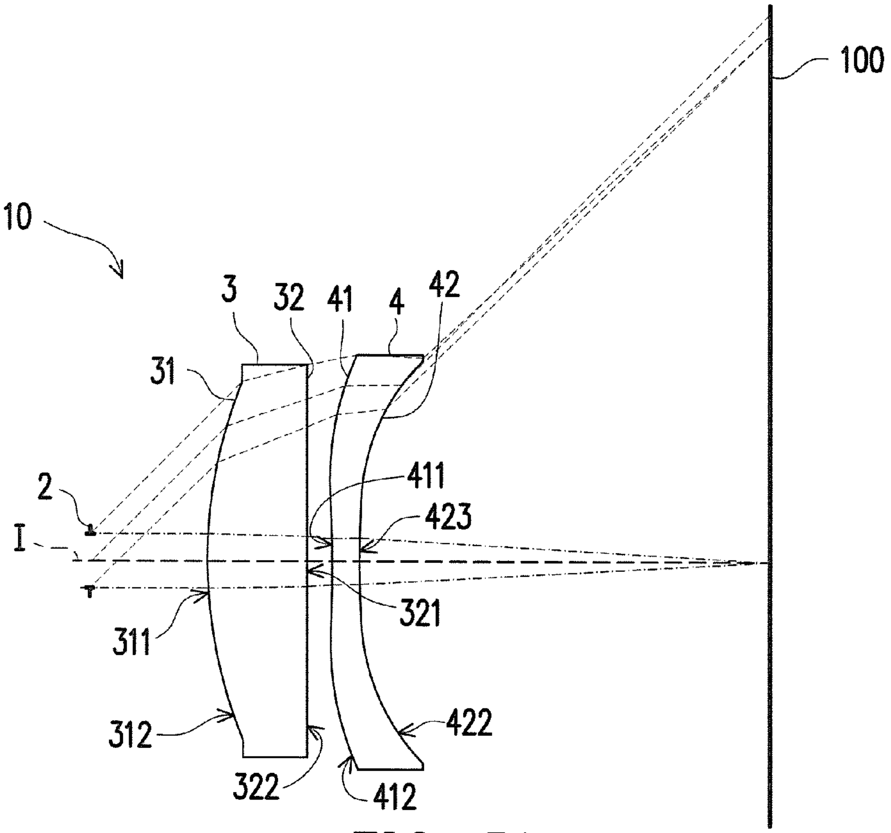
FIG. 31 is a schematic view illustrating an ocular optical system according to a seventh embodiment of the invention.

FIG. 31 is a schematic view illustrating an ocular optical system according to a seventh embodiment of the invention, and FIG. 32A to FIG. 32D illustrate a longitudinal spherical aberration and other aberrations of the ocular optical system according to the seventh embodiment of the invention. Referring to FIG. 31 first, the ocular optical system 10 provided by the seventh embodiment of the invention is substantially similar to that provided by the first embodiment, where only the optical data, the aspheric coefficients, and the parameters of the lens elements 3 and 4 in the two embodiments are different to some extent. In the present embodiment, the display-side surface 42 of the second lens element 4 is a concave surface, and has a concave portion 423 in a vicinity of the optical axis I and a concave portion 422 in a vicinity of a periphery of the lens element. It should be noted that for clear illustration, part of the reference numbers of the concave and the convex portions same as those in the first embodiment are omitted in FIG. 31.

Detailed optical data of the ocular optical system 10 is depicted as FIG. 33. In the seventh embodiment, EFL of the ocular optical system 10 in whole is 36.213 mm, ω is 45.000°, Fno is 9.053, EPD is 4 mm, TTL is 40.768 mm, and SL is 49.321 mm.

Referring to FIG. 34, the aspheric coefficients from the eye-side surface 31 of the first lens element 3 to the display-side surface 42 of the second lens element 4 in the formula (1) according to the seventh embodiment are illustrated.

Additionally, the relationship among the important parameters pertaining to the ocular optical system 10 of the seventh embodiment is indicated in FIG. 52.

Figure 32A:
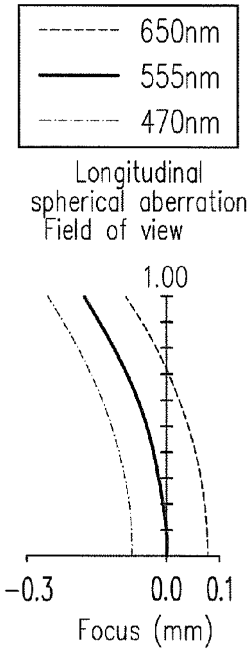
FIG. 32A to FIG. 32D illustrate a longitudinal spherical aberration and other aberrations of the ocular optical system according to the seventh embodiment of the invention.
Figure 32B:
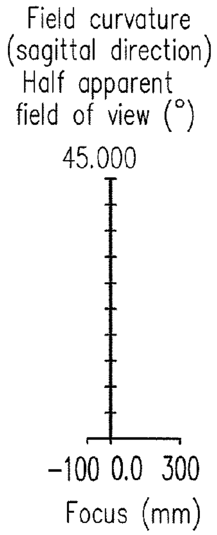
Figure 32C:
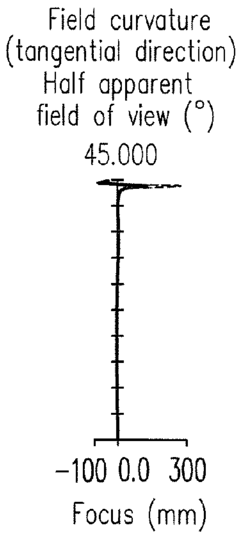
Figure 32D:
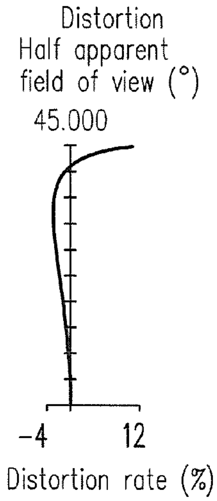

FIG. 32A which illustrates the longitudinal spherical aberration of the seventh embodiment is simulated when the pupil radius is 2.0000 mm. In FIG. 32A which illustrates the longitudinal spherical aberration of the seventh embodiment, the imaging point deviation of the off-axis ray at different heights is controlled within a range of ±0.3 mm. In the two field curvature aberrations illustrated in FIG. 32B and FIG. 32C, the focal length variations of the three type of representative wavelengths within the entire field of view falls within a range of ±300 mm. The diagram of the distortion aberration illustrated in FIG. 32D shows that the distortion aberration of the seventh embodiment can be maintained within a range of ±12%. Accordingly, as being compared with the existing ocular optical systems, the ocular optical system of the seventh embodiment still can provide the favorable imaging quality in the condition that the system length is shortened to about 49.321 mm.

According to the above description, the seventh embodiment in comparison with the first embodiment has advantages as follows. The seventh embodiment is easier to be manufactured than the first embodiment and thus has higher yield.

Figure 35:
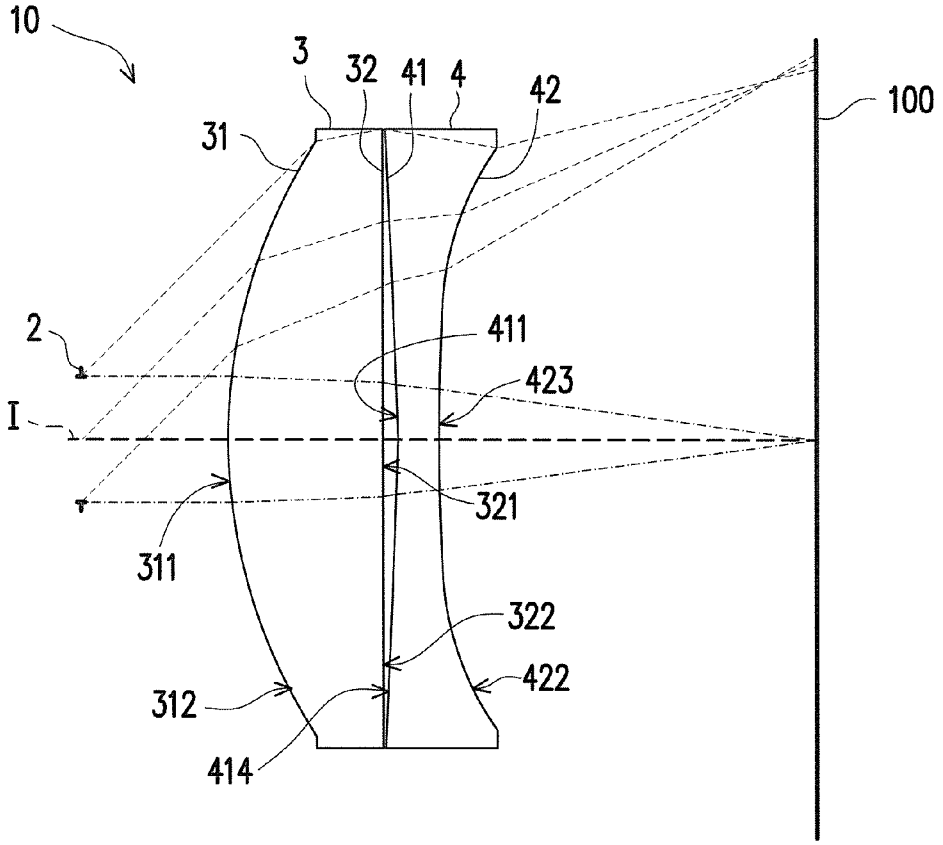
FIG. 35 is a schematic view illustrating an ocular optical system according to an eighth embodiment of the invention.

FIG. 35 is a schematic view illustrating an ocular optical system according to an eighth embodiment of the invention, and FIG. 36A to FIG. 36D illustrate a longitudinal spherical aberration and other aberrations of the ocular optical system according to the eighth embodiment of the invention. Referring to FIG. 35 first, the ocular optical system 10 provided by the eighth embodiment of the invention is substantially similar to that provided by the first embodiment, where only the optical data, the aspheric coefficients, and the parameters of the lens elements 3 and 4 in the two embodiments are different to some extent. In the present embodiment, the eye-side surface 41 of the second lens element 4 is a concave surface, and has a concave portion 411 in a vicinity of the optical axis I and a concave portion 414 in a vicinity of a periphery of the lens element. The display-side surface 42 of the second lens element 4 is a concave surface, and has a concave portion 423 in a vicinity of the optical axis I and a concave portion 422 in a vicinity of the periphery of the lens element. It should be noted that for clear illustration, part of the reference numbers of the concave and the convex portions same as those in the first embodiment are omitted in FIG. 35.

Detailed optical data of the ocular optical system 10 is depicted as FIG. 37. In the eighth embodiment, EFL of the ocular optical system 10 in whole is 14.902 mm, ω is 45.000°, Fno is 3.725, EPD is 4 mm, TTL is 18.620 mm, and SL is 23.272 mm.

Referring to FIG. 38, the aspheric coefficients from the eye-side surface 31 of the first lens element 3 to the display-side surface 42 of the second lens element 4 in the formula (1) according to the eighth embodiment are illustrated.

Additionally, the relationship among the important parameters pertaining to the ocular optical system 10 of the eighth embodiment is indicated in FIG. 52.

Figures 36A, 36B, 36C, 36D:
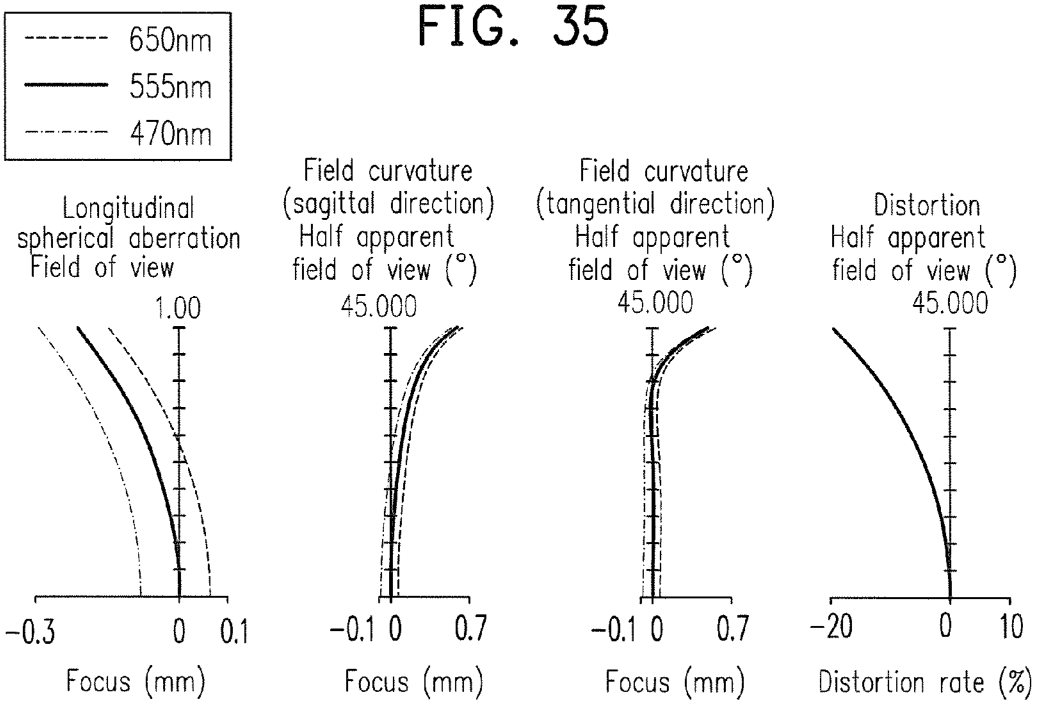
FIG. 36A to FIG. 36D illustrate a longitudinal spherical aberration and other aberrations of the ocular optical system according to the eighth embodiment of the invention.

FIG. 36A which illustrates the longitudinal spherical aberration of the eighth embodiment is simulated when the pupil radius is 2.0000 mm. In FIG. 36A which illustrates the longitudinal spherical aberration of the eighth embodiment, the imaging point deviation of the off-axis ray at different heights is controlled within a range of ±0.3 mm. In the two field curvature aberrations illustrated in FIG. 36B and FIG. 36C, the focal length variations of the three type of representative wavelengths within the entire field of view falls within a range of ±0.7 mm. The diagram of the distortion aberration illustrated in FIG. 36D shows that the distortion aberration of the eighth embodiment can be maintained within a range of ±20%. Accordingly, as being compared with the existing ocular optical systems, the ocular optical system of the eighth embodiment still can provide the favorable imaging quality in the condition that the system length is shortened to about 23.272 mm.

According to the above description, the eighth embodiment in comparison with the first embodiment has advantages as follows. The system length SL of the eighth embodiment is less than that of the first embodiment. The Fno of the eighth embodiment is less than that of the first embodiment. Additionally, the range of the distortion aberration in the tangential direction of the eighth embodiment is smaller than the range of the distortion aberration in the tangential direction of the first embodiment.

Figure 39:
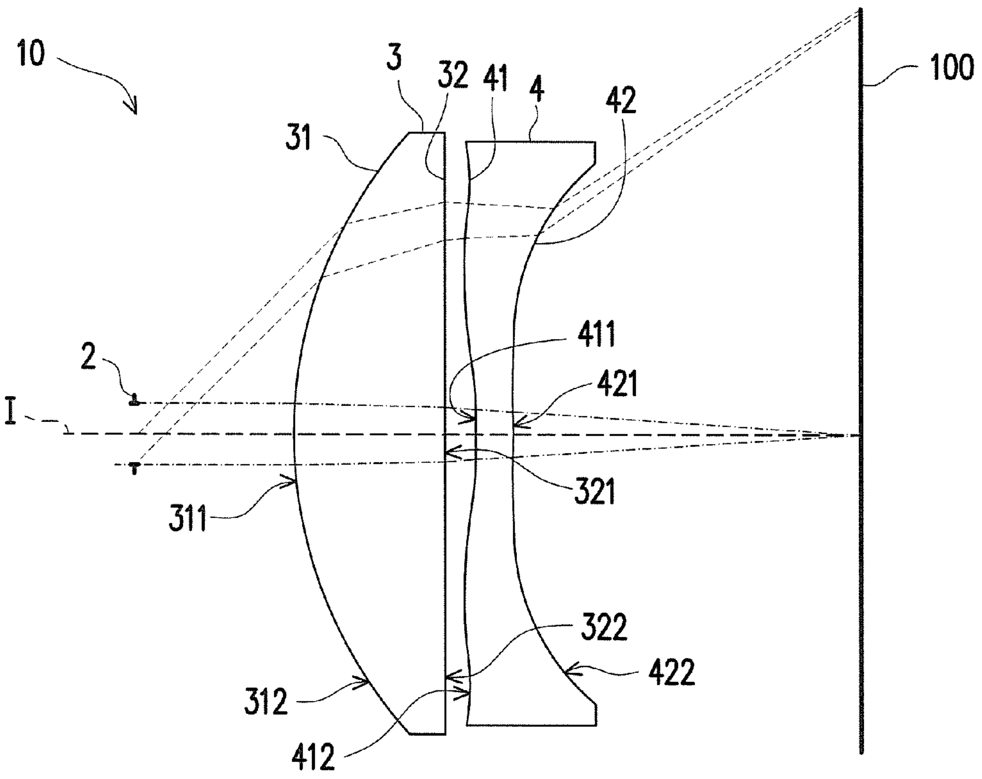
FIG. 39 is a schematic view illustrating an ocular optical system according to a ninth embodiment of the invention.

FIG. 39 is a schematic view illustrating an ocular optical system according to a ninth embodiment of the invention, and FIG. 40A to FIG. 40D illustrate a longitudinal spherical aberration and other aberrations of the ocular optical system according to the ninth embodiment of the invention. Referring to FIG. 39 first, the ocular optical system 10 provided by the ninth embodiment of the invention is substantially similar to that provided by the first embodiment, where only the optical data, the aspheric coefficients, and the parameters of the lens elements 3 and 4 in the two embodiments are different to some extent. It should be noted that for clear illustration, part of the reference numbers of the concave and the convex portions same as those in the first embodiment are omitted in FIG. 39.

Detailed optical data of the ocular optical system 10 is depicted as FIG. 41. In the ninth embodiment, EFL of the ocular optical system 10 in whole is 30.417 mm, ω is 45.000°, Fno is 7.604, EPD is 4 mm, TTL is 37.323 mm, and SL is 47.675 mm.

Referring to FIG. 42, the aspheric coefficients from the eye-side surface 31 of the first lens element 3 to the display-side surface 42 of the second lens element 4 in the formula (1) according to the ninth embodiment are illustrated.

Additionally, the relationship among the important parameters pertaining to the ocular optical system 10 of the ninth embodiment is indicated in FIG. 52.

Figures 40A, 40B, 40C, 40D:
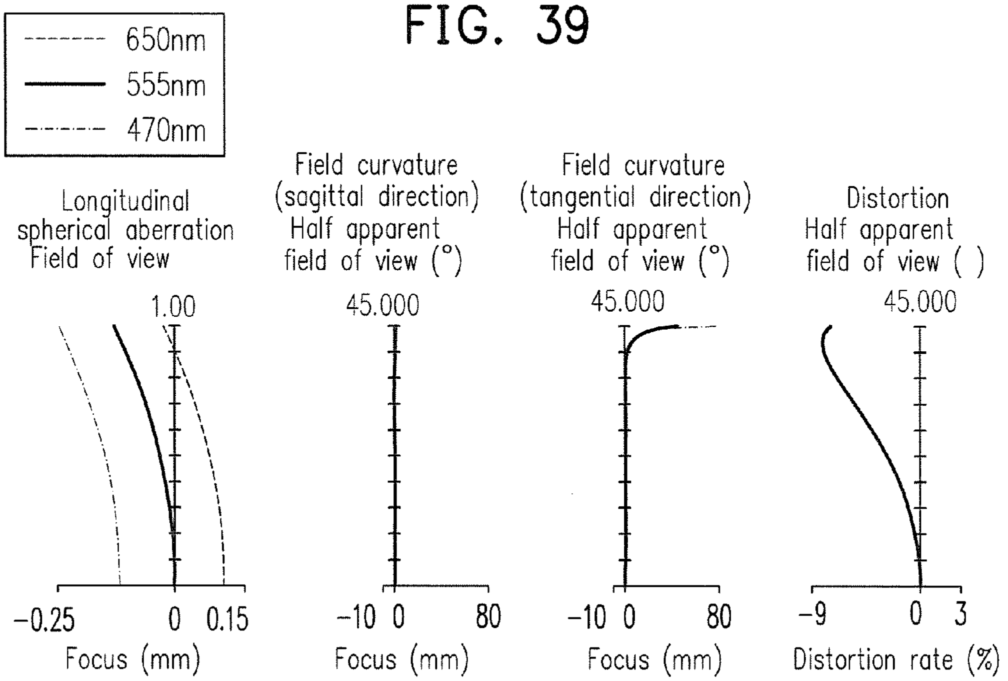
FIG. 40A to FIG. 40D illustrate a longitudinal spherical aberration and other aberrations of the ocular optical system according to the ninth embodiment of the invention.

FIG. 40A which illustrates the longitudinal spherical aberration of the ninth embodiment is simulated when the pupil radius is 2.0000 mm. In FIG. 40A which illustrates the longitudinal spherical aberration of the ninth embodiment, the imaging point deviation of the off-axis ray at different heights is controlled within a range of ±0.25 mm. In the two field curvature aberrations illustrated in FIG. 40B and FIG. 40C, the focal length variations of the three type of representative wavelengths within the entire field of view falls within a range of ±80 mm. The diagram of the distortion aberration illustrated in FIG. 40D shows that the distortion aberration of the ninth embodiment can be maintained within a range of ±9%. Accordingly, as being compared with the existing ocular optical systems, the ocular optical system of the ninth embodiment still can provide the favorable imaging quality in the condition that the system length is shortened to about 47.675 mm.

According to the above description, the ninth embodiment in comparison with the first embodiment has advantages as follows. The Fno of the ninth embodiment is less than that of the first embodiment. Additionally, the range of the distortion aberration of the ninth embodiment is smaller than the range of the distortion aberration of the first embodiment.

Figure 43:
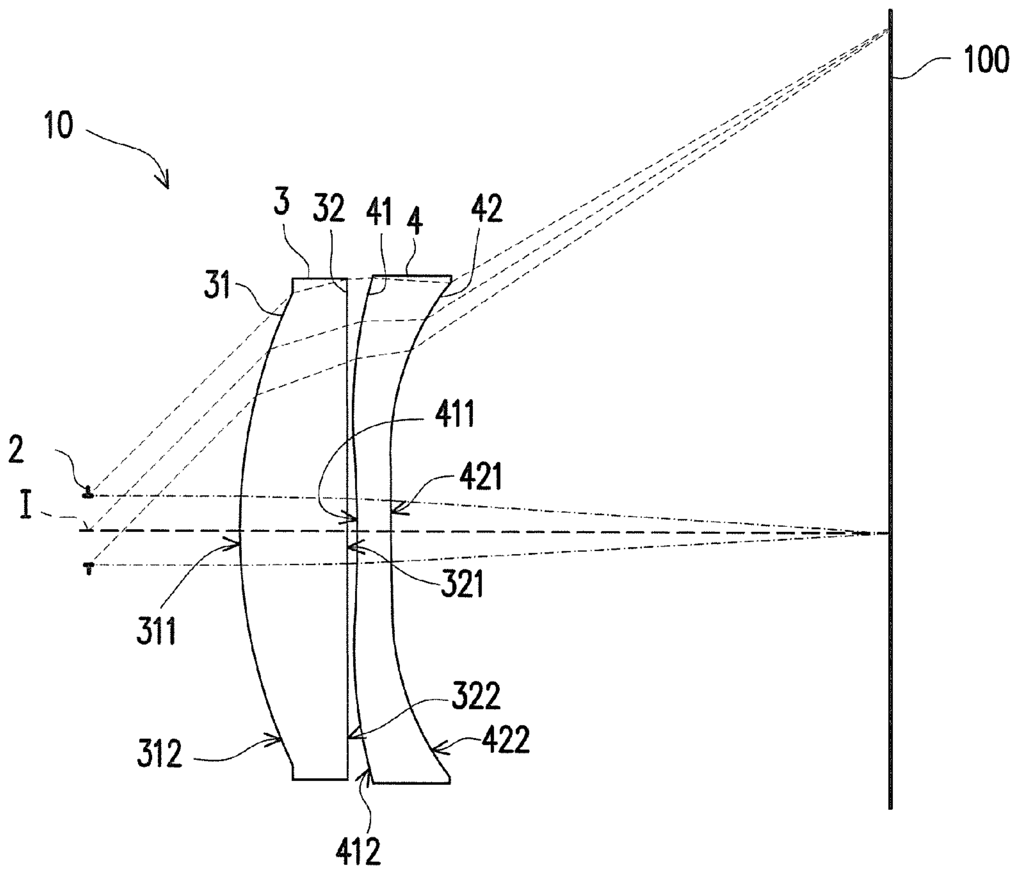
FIG. 43 is a schematic view illustrating an ocular optical system according to a tenth embodiment of the invention.

FIG. 43 is a schematic view illustrating an ocular optical system according to a tenth embodiment of the invention, and FIG. 44A to FIG. 44D illustrate a longitudinal spherical aberration and other aberrations of the ocular optical system according to the tenth embodiment of the invention. Referring to FIG. 43 first, the ocular optical system 10 provided by the tenth embodiment of the invention is substantially similar to that provided by the first embodiment, where only the optical data, the aspheric coefficients, and the parameters of the lens elements 3 and 4 in the two embodiments are different to some extent. It should be noted that for clear illustration, part of the reference numbers of the concave and the convex portions same as those in the first embodiment are omitted in FIG. 43.

Detailed optical data of the ocular optical system 10 is depicted as FIG. 45. In the tenth embodiment, EFL of the ocular optical system 10 in whole is 33.839 mm, ω is 45.000°, Fno is 8.460, EPD is 4 mm, TTL is 38.634 mm, and SL is 47.613 mm.

Referring to FIG. 46, the aspheric coefficients from the eye-side surface 31 of the first lens element 3 to the display-side surface 42 of the second lens element 4 in the formula (1) according to the tenth embodiment are illustrated.

Additionally, the relationship among the important parameters pertaining to the ocular optical system 10 of the tenth embodiment is indicated in FIG. 52.

Figures 44A, 44B, 44C, 44D:
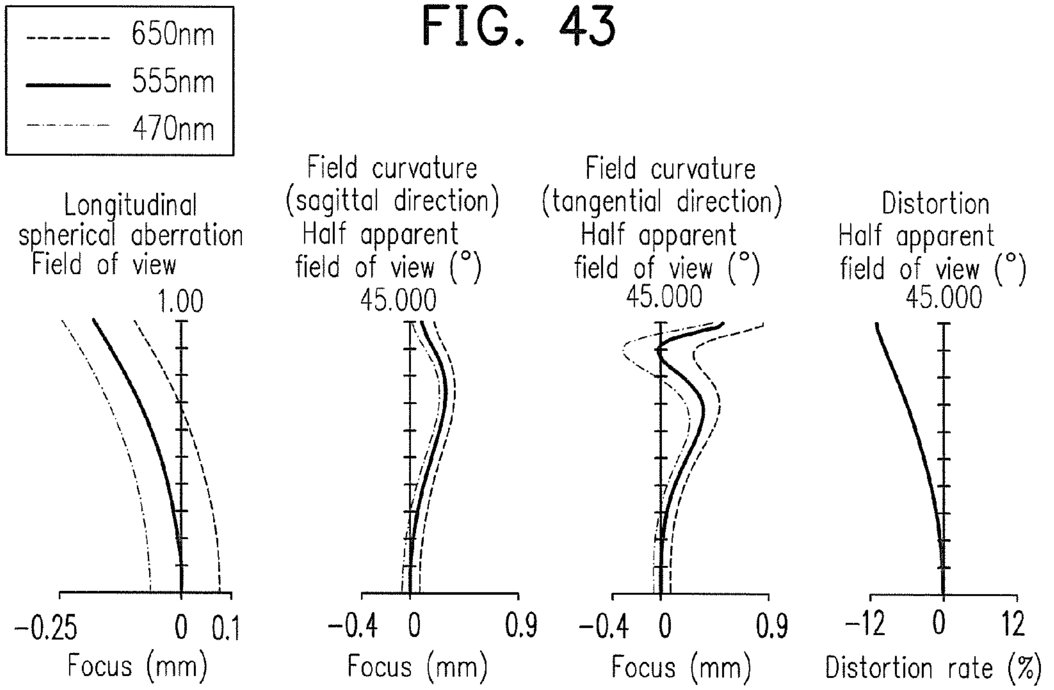
FIG. 44A to FIG. 44D illustrate a longitudinal spherical aberration and other aberrations of the ocular optical system according to the tenth embodiment of the invention.

FIG. 44A which illustrates the longitudinal spherical aberration of the tenth embodiment is simulated when the pupil radius is 2.0000 mm. In FIG. 44A which illustrates the longitudinal spherical aberration of the tenth embodiment, the imaging point deviation of the off-axis ray at different heights is controlled within a range of ±0.25 mm. In the two field curvature aberrations illustrated in FIG. 44B and FIG. 44C, the focal length variations of the three type of representative wavelengths within the entire field of view falls within a range of ±0.9 mm. The diagram of the distortion aberration illustrated in FIG. 44D shows that the distortion aberration of the tenth embodiment can be maintained within a range of ±12%. Accordingly, as being compared with the existing ocular optical systems, the ocular optical system of the tenth embodiment still can provide the favorable imaging quality in the condition that the system length is shortened to about 47.613 mm.

Figure 47:
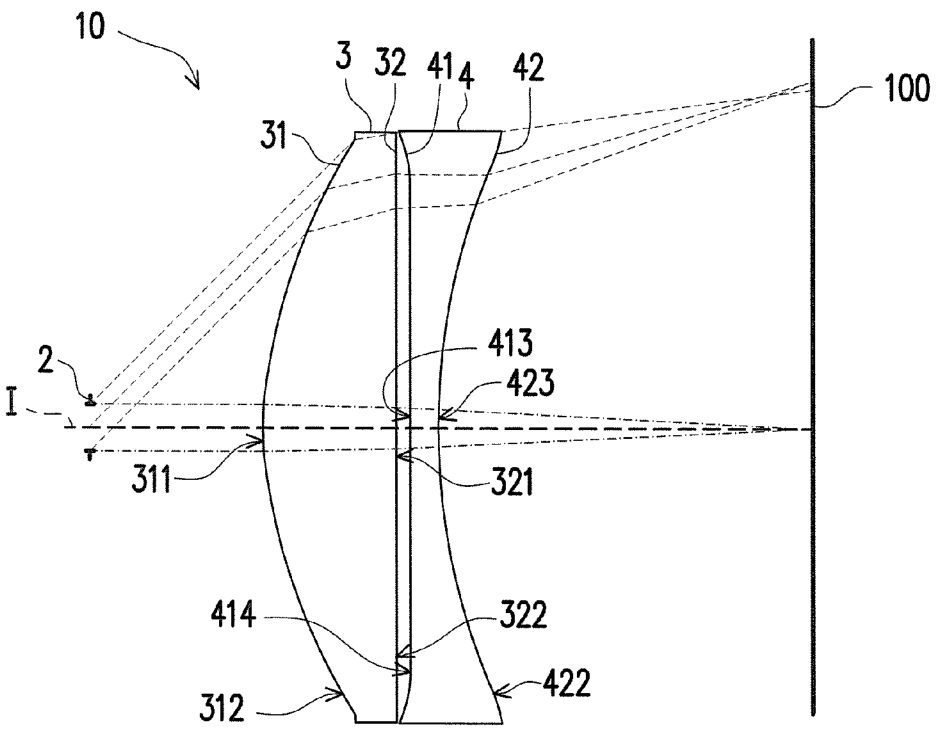
FIG. 47 is a schematic view illustrating an ocular optical system according to an eleventh embodiment of the invention.

FIG. 47 is a schematic view illustrating an ocular optical system according to an eleventh embodiment of the invention, and FIG. 48A to FIG. 48D illustrate a longitudinal spherical aberration and other aberrations of the ocular optical system according to the eleventh embodiment of the invention. Referring to FIG. 47 first, the ocular optical system 10 provided by the eleventh embodiment of the invention is substantially similar to that provided by the first embodiment, where only the optical data, the aspheric coefficients, and the parameters of the lens elements 3 and 4 in the two embodiments are different to some extent. In the present embodiment, the eye-side surface surface 41 of the second lens element 4 has a convex portion 413 in a vicinity of the optical axis I and a concave portion 414 in a vicinity of a periphery of the lens element. The display-side surface 42 of the second lens element 4 is a concave surface, and has a concave portion 423 in a vicinity of the optical axis I and a concave portion 422 in a vicinity of the periphery of the lens element. It should be noted that for clear illustration, part of the reference numbers of the concave and the convex portions same as those in the first embodiment are omitted in FIG. 47.

Detailed optical data of the ocular optical system 10 is depicted as FIG. 49. In the eleventh embodiment, EFL of the ocular optical system 10 in whole is 40.006 mm, ω is 45.000°, Fno is 10.001, EPD is 4 mm, TTL is 47.125 mm, and SL is 62.061 mm.

Referring to FIG. 50, the aspheric coefficients from the eye-side surface 31 of the first lens element 3 to the display-side surface 42 of the second lens element 4 in the formula (1) according to the eleventh embodiment are illustrated.

Additionally, the relationship among the important parameters pertaining to the ocular optical system 10 of the eleventh embodiment is indicated in FIG. 52.

Figures 48A, 48B, 48C, 48D:
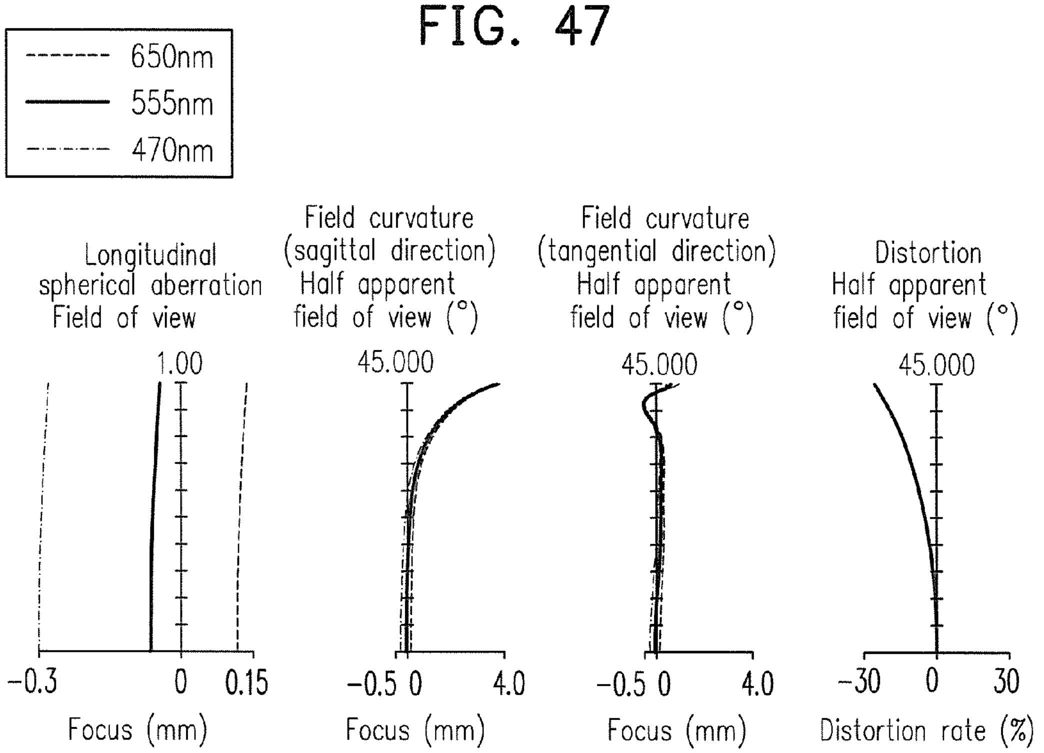
FIG. 48A to FIG. 48D illustrate a longitudinal spherical aberration and other aberrations of the ocular optical system according to the eleventh embodiment of the invention.

FIG. 48A which illustrates the longitudinal spherical aberration of the eleventh embodiment is simulated when the pupil radius is 2.0000 mm. In FIG. 48A which illustrates the longitudinal spherical aberration of the eleventh embodiment, the imaging point deviation of the off-axis ray at different heights is controlled within a range of ±0.3 mm. In the two field curvature aberrations illustrated in FIG. 48B and FIG. 48C, the focal length variations of the three type of representative wavelengths within the entire field of view falls within a range of ±4.0 mm. The diagram of the distortion aberration illustrated in FIG. 48D shows that the distortion aberration of the eleventh embodiment can be maintained within a range of ±30%. Accordingly, as being compared with the existing ocular optical systems, the ocular optical system of the eleventh embodiment still can provide the favorable imaging quality in the condition that the system length is shortened to about 62.061 mm.

According to the above description, the eleventh embodiment in comparison with the first embodiment has advantages as follows. In addition, the eleventh embodiment is easier to be manufactured than the first embodiment and thus has higher yield.

Further, referring to FIG. 51 to FIG. 52, FIG. 51 is a table diagram showing the optical parameters of the aforementioned first to sixth embodiments, and FIG. 52 is a table diagram showing the optical parameters of the aforementioned seventh to eleventh embodiments.

In the ocular optical system 10 according to the embodiments of the invention, the maximum distance between the display-side surface 32 of the first lens element 3 and the eye-side surface 41 of the second lens element 4 parallel to the direction of the optical axis I is less than 5 mm. Because the distance between the first lens element 3 and the second lens element 4 is designed to be small, the optical effective diameter of each of the lens elements (e.g., the first lens element 3 and the second lens element 4) of the ocular optical system 10 is large, which contributes to the mechanism design of the ocular optical system 10 to prevent the occurrence of stray light. Thereby, the ocular optical system 10 can have favorable imaging quality.

If the relationship among the optical parameters in the ocular optical system 10 provided by the embodiments of the invention satisfies at least one of the following conditions, it assists the designer in designing the ocular optical system with favorable optical performance, a effectively reduced length in whole and technical feasibility.

1. In order to achieve the reduced system length in whole, the thickness of each lens element and the air gap between the lens elements are adaptively reduced in the invention; however, the lens thickness and the air gap between the lens elements must be adapted for each other in the premise that difficulty in the assembling process of the lens elements has to be considered while the imaging quality is taken into account. Therefore, the ocular optical system can achieve preferable configuration if satisfying the values limited in the following conditions.

$6 \leq DLD/EPD \leq 20$;

$2 \leq EFL/(T1+G12+T2)$; preferably $2.0 \leq EFL/(T1+G12+T2) \leq 4.0$;

$1.2 \leq TTL/G2D$; preferably $1.2 \leq TTL/G2D \leq 2.0$;

$2.5 \leq T1/T2$; preferably $2.5 \leq T1/T2 \leq 5.5$;

$3.5 \leq (T1+G12)/T2$; preferably $3.5 \leq (T1+G12)/T2 \leq 6.5$;

$3.0 \leq EFL/T1$; preferably $3.0 \leq EFL/T1 \leq 5.5$;

$10.0 \leq EFL/T2$; preferably $10.0 \leq EFL/T2 \leq 18.0$;

$0.5 \leq ER/(T1+T2)$; preferably $0.5 \leq ER/(T1+T2) \leq 1.5$;

$3.0 \leq TTL/(T1+T2)$; preferably $3.0 \leq TTL/(T1+T2) \leq 5.0$;

$G2D/T2 \leq 15.0$; preferably $8.0 \leq G2D/T2 \leq 15.0$;

$3.5 \leq D1/T1$; preferably $3.5 \leq D1/T1 \leq 4.5$; and $15.0 \leq D2/T2$; preferably $15.0 \leq D2/T2 \leq 21.0$.

2. By designing the region in a vicinity the periphery of the display-side surface of the second lens element as a concave portion, the lens thickness of the region in a vicinity the periphery of the second lens element may be thicker, which facilitates correcting the aberration of the ocular optical system 10 to achieve favorable imaging quality.

3. By designing one of the eye-side surface and the display-side surface of the first lens element as a Fresnel surface (i.e., a surface of a Fresnel lens), for example, designing the display-side surface of the first lens element as the Fresnel surface, the thickness of the first lens element can be reduced, which facilitates shortening the system length of the ocular optical system 10 in whole.

In view of the unpredictability of the design of an optical system, with the framework set forth in the embodiments of the invention, the ocular optical system 10 satisfying the aforementioned conditions can be characterized by the reduced system length, the large apparent field of view, the favorable imaging quality, or the enhanced assembly yield, such that the shortcomings described in the related art can be improved.

Additionally, the aforementioned limitation relations are provided in an exemplary sense and can be randomly and selectively combined and applied to the implementation aspects of the invention in different manners, which construe any limitations to the invention. In implementation of the invention, besides the above-described relations, it is also possible to design additional detailed structures such as more concave and convex curvatures arrangement for a specific lens element or widely for a plurality of lens elements so as to enhance the control of system property and/or resolution. For example, it is optional to form an additional concave portion in a vicinity of the optical axis or in a vicinity of the periphery on the eye-side surface of the first lens element. It should be noted that the above-described details can be optionally combined and applied to the other embodiments of the invention in the condition where they are not in conflict with one another.

In light of the foregoing, the ocular optical system 10 provided by the embodiments of the invention can achieve the following effects and advantages:

1. The longitudinal spherical aberration, the field curvature aberration and the distortion of each of the embodiments of the invention are all in compliance with usage specifications. Moreover, the off-axis rays of the three types of representative wavelengths (which are 650 nm (red ray), 555 nm (green ray) and 470 nm (blue ray)) at different heights are all gathered around imaging points, and according to a deviation range of each curve, it can be observed that deviations of the imaging points of the off-axis rays at different heights are all controlled and thus capable of suppressing spherical aberrations, image aberrations, and distortion. With further reference to the imaging quality data, distances among the three types of representative wavelengths (650 nm, 555 nm and 470 nm) are fairly close, which indicates that rays with different wavelengths in the embodiments of the invention can be well concentrated under different circumstances to provide the capability of suppressing dispersion. As such, it can be known from the above that, the embodiments of the invention can provide favorable optical properties.

2. The maximum distance between the display-side surface of the first lens element and the eye-side surface of the second lens element of the ocular optical system 10 provided by the embodiments of the invention parallel to the direction of the optical axis is less than 5 mm, which contributes to the mechanism design of the ocular optical system 10 to prevent the occurrence of stray light. Additionally, the ocular optical system 10 satisfies: $6 \leq DLD/EPD \leq 20$. With the designs of the distance between the lens elements, the relationship between the exit pupil diameter and the diagonal length of the display screen of the ocular optical system and the optical parameters, the system length can be effectively shortened to ensure imaging quality and facilitate the ocular optical system 10 in having a large apparent field of view.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. An ocular optical system, adapted for imaging of an imaging ray from a display screen which enters an eye of an observer via the ocular optical system, a side facing towards the eye being an eye-side, and a side facing towards the display screen being a display-side, wherein the ocular optical system comprises a first lens element and a second lens element in order from the eye-side to the display-side along an optical axis, each of the first lens element and the second lens element of the ocular optical system comprises an eye-side surface facing towards the eye-side and allowing the imaging ray to pass through and a display-side surface facing towards the display-side and allowing the imaging ray to pass through, wherein a maximum distance between the display-side surface of the first lens element and the eye-side surface of the second lens element parallel to a direction of the optical axis is less than 5 millimeters (mm), and the ocular optical system satisfies:

$6 \leq DLD/EPD \leq 20,$ wherein DLD represents a diagonal length of the display screen corresponding to one single pupil of the observer, and EPD represents an exit pupil diameter of the ocular optical system.

2. The ocular optical system according to claim 1, wherein the ocular optical system further satisfies: $2 \leq EFL/(T1+G12+T2)$, wherein EFL represents a system focal length of the ocular optical system, T1 represents a thickness of the first lens element along the optical axis, T2 represents a thickness of the second lens element along the optical axis, and G12 represents an air gap between the first lens element and the second lens element along the optical axis.

3. The ocular optical system according to claim 1, wherein the display-side surface of the second lens element has a concave portion in a vicinity of a periphery of the lens element.

4. The ocular optical system according to claim 1, wherein the ocular optical system further satisfies: $1.2 \leq TTL/G2D$, wherein TTL represents a distance from the eye-side surface of the first lens element to the display screen along the optical axis, and G2D represents a distance from the display-side surface of the second lens element to the display screen along the optical axis.

5. The ocular optical system according to claim 1, wherein the ocular optical system further satisfies: $2.5 \leq T1/T2$, wherein T1 represents a thickness of the first lens element along the optical axis, and T2 represents a thickness of the second lens element along the optical axis.

6. The ocular optical system according to claim 1, wherein the ocular optical system further satisfies: $3.5 \leq (T1+G12)/T2$, wherein T1 represents a thickness of the first lens element along the optical axis, T2 represents a thickness of the second lens element along the optical axis, and G12 represents an air gap between the first lens element and the second lens element along the optical axis.

7. The ocular optical system according to claim 1, wherein the ocular optical system further satisfies: $3.0 \leq EFL/T1$, wherein EFL represents a system focal length of the ocular optical system, and T1 represents a thickness of the first lens element along the optical axis.

8. The ocular optical system according to claim 1, wherein the ocular optical system further satisfies: $10.0 \leq EFL/T2$, wherein EFL represents a system focal length of the ocular optical system, and T2 represents a thickness of the second lens element along the optical axis.

9. The ocular optical system according to claim 1, wherein the ocular optical system further satisfies: $0.5 \leq ER/(T1+T2)$, wherein ER represents a distance from the pupil of the eye of the observer to the eye-side surface of first lens element along the optical axis.

10. The ocular optical system according to claim 1, wherein the ocular optical system further satisfies: $3.0 \leq TTL/(T1+T2)$, wherein TTL represents a distance from the eye-side surface of the first lens element to the display screen along the optical axis, T1 represents a thickness of the first lens element along the optical axis, and T2 represents a thickness of the second lens element along the optical axis.

11. The ocular optical system according to claim 1, one of the eye-side surface and the display-side surface of the first lens element is a Fresnel surface.

12. The ocular optical system according to claim 11, wherein the display-side surface of the first lens element is the Fresnel surface.

13. The ocular optical system according to claim 1, wherein the ocular optical system further satisfies: $G2D/T2 \leq 15.0$, wherein G2D represents a distance from the display-side surface of the second lens element to the display screen along the optical axis, and T2 represents a thickness of the second lens element along the optical axis.

14. The ocular optical system according to claim 1, wherein the ocular optical system further satisfies: $3.5 \leq D1/T1$, wherein D1 is an optical effective diameter of the eye-side surface of the first lens element, and T1 represents a thickness of the first lens element along the optical axis.

15. The ocular optical system according to claim 1, wherein the ocular optical system further satisfies: $15.0 \leq D2/T2$, wherein D2 is an optical effective diameter of the eye-side surface of the second lens element, and T2 represents a thickness of the second lens element along the optical axis.

* * * * *